(12) United States Patent
Biswas et al.

(10) Patent No.: US 10,997,740 B2
(45) Date of Patent: May 4, 2021

(54) METHOD, APPARATUS, AND SYSTEM FOR PROVIDING REAL-WORLD DISTANCE INFORMATION FROM A MONOCULAR IMAGE

(71) Applicant: HERE GLOBAL B.V., Eindhoven (NL)

(72) Inventors: Souham Biswas, Haryana (IN); Sanjay Kumar Boddhu, Aurora, IL (US)

(73) Assignee: HERE Global B.V., Eindhoven (NL)

( * ) Notice: Subject to any disclaimer, the term of this patent is extended or adjusted under 35 U.S.C. 154(b) by 97 days.

(21) Appl. No.: 16/511,892

(22) Filed: Jul. 15, 2019

(65) Prior Publication Data
US 2021/0019897 A1    Jan. 21, 2021

(51) Int. Cl.
| | | |
|---|---|---|
| *G06T 7/536* | (2017.01) | |
| *G06T 7/73* | (2017.01) | |
| *G06K 9/00* | (2006.01) | |
| *G06T 7/11* | (2017.01) | |

(52) U.S. Cl.
CPC .......... *G06T 7/536* (2017.01); *G06K 9/00798* (2013.01); *G06T 7/11* (2017.01); *G06T 7/73* (2017.01); *G06T 2207/30244* (2013.01); *G06T 2207/30256* (2013.01)

(58) Field of Classification Search
CPC ... G06T 7/536; G06T 7/11; G06T 7/73; G06T 2207/30244; G06T 2207/30256; G06K 9/00798
See application file for complete search history.

(56) References Cited

U.S. PATENT DOCUMENTS

| | | |
|---|---|---|
| 7,372,550 B2 | 5/2008 | Goris et al. |
| 9,070,191 B2 | 6/2015 | Murashita |
| 2010/0098297 A1* | 4/2010 | Zhang .................. G06K 9/4652 382/104 |

(Continued)

OTHER PUBLICATIONS

Salih et al., "Depth and Geometry from a Single 2d Image Using Triangulation", Conference Paper, 2012 IEEE International Conference on Multimedia and Expo Workshops, Jul. 2012, pp. 511-515.

(Continued)

*Primary Examiner* — Brenda C Bernardi
(74) *Attorney, Agent, or Firm* — Ditthavong, Steiner & Mlotkowski

(57) ABSTRACT

An approach is provided for estimating a real-world depth information from a monocular image. The approach, for example, involves determining a vanishing point of the monocular image captured by a camera. The approach also involves generating a vanishing point ray from an optical center of the camera through the vanishing point on an image plane of the monocular image to infinity. The approach further involves generating a center line ray from the optical center through a geometric center of the image plane to a feature line that is parallel to the vanishing point ray at a lateral distance. The approach further involves generating a feature ray from the optical center through a location of the feature on the image plane to the feature line. The approach further involves computing the real-world distances of the feature based on image coordinates of the rays, lines, angles derived therefrom, and a known pixel-wise distance of the monocular image.

20 Claims, 21 Drawing Sheets

(56) References Cited

U.S. PATENT DOCUMENTS

| | | | |
|---|---|---|---|
| 2012/0069185 A1* | 3/2012 | Stein | H04N 7/183 |
| | | | 348/148 |
| 2019/0034740 A1* | 1/2019 | Kwant | G06K 9/4671 |
| 2019/0042860 A1* | 2/2019 | Lee | G06K 9/00798 |
| 2020/0082178 A1* | 3/2020 | Ahn | G06T 7/187 |
| 2020/0117920 A1* | 4/2020 | Lee | G06K 9/4604 |
| 2020/0167578 A1* | 5/2020 | Ding | G06K 9/00798 |
| 2020/0217656 A1* | 7/2020 | Tang | G06K 9/00798 |

OTHER PUBLICATIONS

Ramirez et al., "Geometry Meets Semantics for Semi-supervised Monocular Depth Estimation", Oct. 26, 2018, pp. 1-16.

* cited by examiner

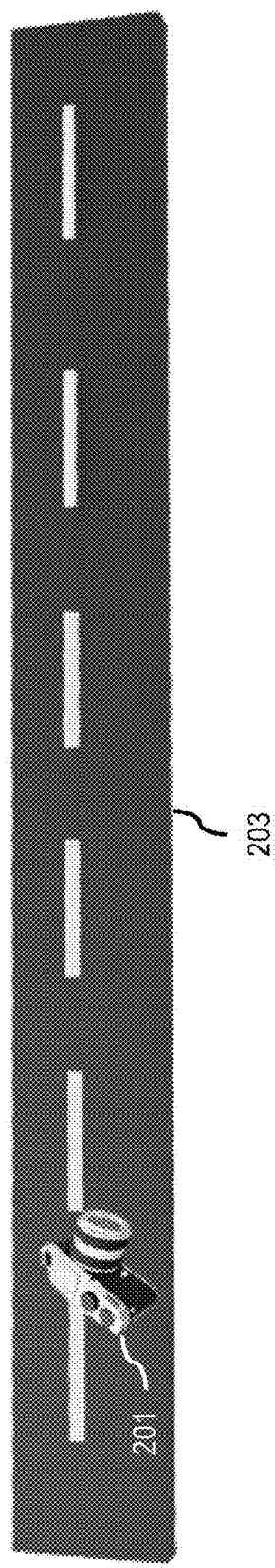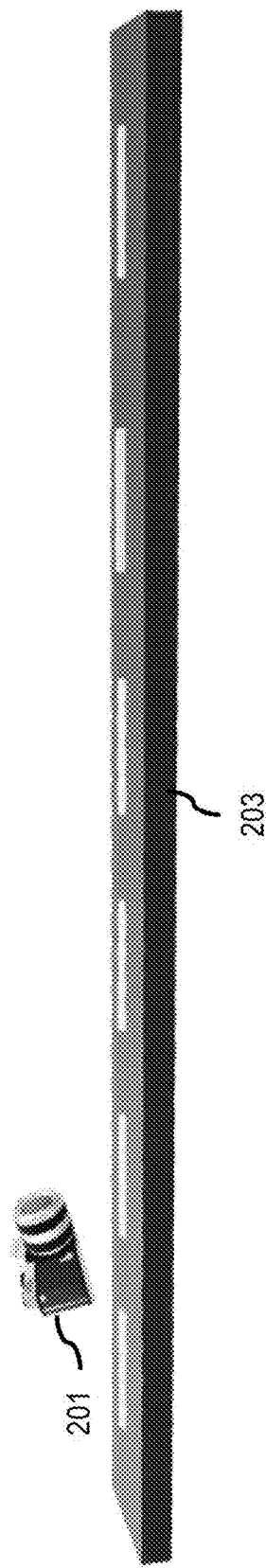
FIG. 2A
FIG. 2B

METHOD, APPARATUS, AND SYSTEM FOR PROVIDING REAL-WORLD DISTANCE INFORMATION FROM A MONOCULAR IMAGE

BACKGROUND

Modern location-based services and applications (e.g., autonomous driving) rely on having accurate and up-to-date digital map data. One approach to maintaining digital map data is to deploy vehicles to capture street images of map features (e.g., signs or other pole-like objects on near roadways) and then use the images to determine the real-world distances or depths of the features with respect to a known real-world location of the camera or a coordinate reference frame of the digital map. However, accurate and consistent distance or depth estimation using images can present significant technical challenges, particularly when a single monocular (i.e., non-stereoscopic) image is taken.

SOME EXAMPLE EMBODIMENTS

Therefore, there is a need for an approach for providing accurate real-world distance or depth information from a monocular image.

According to one embodiment, a method comprises determining a vanishing point of the monocular image captured by a camera. The method also comprises generating a vanishing point ray from an optical center of the camera through the vanishing point on an image plane of the monocular image to infinity. The method further comprises generating a center line ray from the optical center of the camera through a geometric center of the image plane to a feature line. The feature line, for instance, is parallel to the vanishing point ray at a horizontal distance corresponding to a feature location and the feature location corresponds to a feature depicted in the monocular image. The method further comprises generating a feature ray from the optical center of the camera through a feature pixel location of the feature on the image plane to the feature location on the feature line. The method further comprises computing the horizontal distance, a depth, or a combination of the feature location based on image coordinate data corresponding the vanishing point ray, the center line ray, the feature ray, one or more angles derived therefrom, and a known pixel-wise distance of the monocular image.

In one embodiment, a method for determining the vanishing point in the image can comprise but is not limited to segmenting the image into a plurality of road pixels and a plurality of non-road pixels. The method also comprises extracting a road mask from the image based on the segmenting, wherein road mask comprises the plurality of road pixels. The method further comprises determining a closest pixel of the road mask to a horizon of the image as an initial estimation of the vanishing point. In one embodiment, the method can further comprise iteratively computing a subsequent estimation of the vanishing point at an offset from the initial estimation or a previous estimation of the vanishing point until a difference between the initial estimation or the previous estimation and the subsequent estimation is below a threshold value.

According to another embodiment, an apparatus comprises at least one processor, and at least one memory including computer program code for one or more computer programs, the at least one memory and the computer program code configured to, with the at least one processor, cause, at least in part, the apparatus to determine a vanishing point of the monocular image captured by a camera. The apparatus is also caused to generate a vanishing point ray from an optical center of the camera through the vanishing point on an image plane of the monocular image to infinity. The apparatus is further caused to generate a center line ray from the optical center of the camera through a geometric center of the image plane to a feature line. The feature line, for instance, is parallel to the vanishing point ray at a lateral distance corresponding to a feature location and the feature location corresponds to a feature depicted in the monocular image. The apparatus is further caused to generate a feature ray from the optical center of the camera through a feature pixel location of the feature on the image plane to the feature location on the feature line. The apparatus is further caused to compute the horizontal distance, a depth, or a combination of the feature location based on image coordinate data corresponding the vanishing point ray, the center line ray, the feature ray, one or more angles derived therefrom, and a known pixel-wise distance of the monocular image.

In one embodiment, an apparatus for determining the vanishing point in the image can comprise at least one processor, and at least one memory including computer program code for one or more computer programs, the at least one memory and the computer program code configured to, with the at least one processor, cause, at least in part, the apparatus to segment the image into a plurality of road pixels and a plurality of non-road pixels. The apparatus is also caused to extract a road mask from the image based on the segmenting, wherein road mask comprises the plurality of road pixels. The apparatus further causes the apparatus to determine a closest pixel of the road mask to a horizon of the image as an initial estimation of the vanishing point. In one embodiment, the apparatus can be further caused to iteratively compute a subsequent estimation of the vanishing point at an offset from the initial estimation or a previous estimation of the vanishing point until a difference between the initial estimation or the previous estimation and the subsequent estimation is below a threshold value.

According to another embodiment, a non-transitory computer-readable storage medium carries one or more sequences of one or more instructions which, when executed by one or more processors, cause, at least in part, an apparatus to determine a vanishing point of the monocular image captured by a camera. The apparatus is also caused to generate a vanishing point ray from an optical center of the camera through the vanishing point on an image plane of the monocular image to infinity. The apparatus is further caused to generate a center line ray from the optical center of the camera through a geometric center of the image plane to a feature line. The feature ray, for instance, is parallel to the vanishing point ray at a lateral distance corresponding to a feature location and the feature location corresponds to a feature depicted in the monocular image. The apparatus is further caused to generate a feature ray from the optical center of the camera through a feature pixel location of the feature on the image plane to the feature location on the feature line. The apparatus is further caused to compute the horizontal distance, a depth, or a combination of the feature location based on image coordinate data corresponding the vanishing point ray, the center line ray, the feature ray, one or more angles derived therefrom, and a known pixel-wise distance of the monocular image.

In one embodiment, a non-transitory computer-readable storage medium for determining the vanishing point in the image can carries one or more sequences of one or more instructions which, when executed by one or more processors, cause, at least in part, an apparatus to segment the image into a plurality of road pixels and a plurality of non-road pixels. The apparatus is also caused to extract a road mask from the image based on the segmenting, wherein road mask comprises the plurality of road pixels. The apparatus further causes the apparatus to determine a closest pixel of the road mask to a horizon of the image as an initial estimation of the vanishing point. In one embodiment, the apparatus can be further caused to iteratively compute a subsequent estimation of the vanishing point at an offset from the initial estimation or a previous estimation of the vanishing point until a difference between the initial estimation or the previous estimation and the subsequent estimation is below a threshold value.

According to another embodiment, an apparatus comprises means for determining a vanishing point of the monocular image captured by a camera. The apparatus also comprises means for generating a vanishing point ray from an optical center of the camera through the vanishing point on an image plane of the monocular image to infinity. The apparatus further comprises means for generating a center line ray from the optical center of the camera through a geometric center of the image plane to a feature line. The feature line, for instance, is parallel to the vanishing point ray at a lateral distance corresponding to a feature location and the feature location corresponds to a feature depicted in the monocular image. The apparatus further comprises means for generating a feature ray from the optical center of the camera through a feature pixel location of the feature on the image plane to the feature location on the feature line. The apparatus further comprises means for computing the horizontal distance, a depth, or a combination of the feature location based on image coordinate data corresponding the vanishing point ray, the center line ray, the feature ray, one or more angles derived therefrom, and a known pixel-wise distance of the monocular image.

In one embodiment, an apparatus for determining the vanishing point in the image can comprise but is not limited to means for segmenting the image into a plurality of road pixels and a plurality of non-road pixels. The apparatus also comprises means for extracting a road mask from the image based on the segmenting, wherein road mask comprises the plurality of road pixels. The apparatus further comprises means for determining a closest pixel of the road mask to a horizon of the image as an initial estimation of the vanishing point. In one embodiment, the apparatus can further comprise means for iteratively computing a subsequent estimation of the vanishing point at an offset from the initial estimation or a previous estimation of the vanishing point until a difference between the initial estimation or the previous estimation and the subsequent estimation is below a threshold value.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 2A and 2B are diagram illustrating example views of a camera orientation with respect to a road, according to one embodiment;

DESCRIPTION OF SOME EMBODIMENTS

Examples of a method, apparatus, and computer program for providing real-world distance information from an image are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
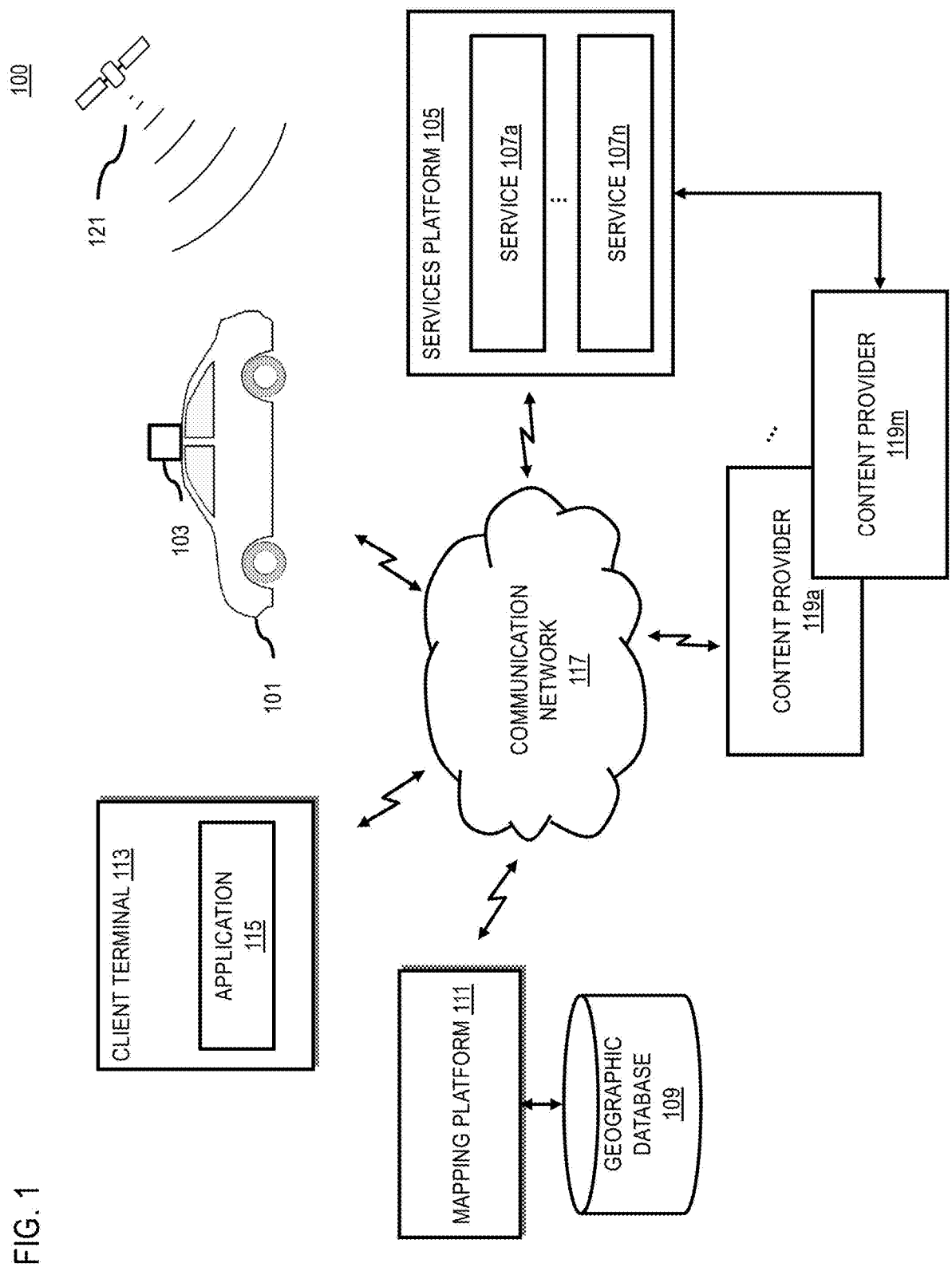
FIG. 1 is a diagram of a system capable of providing real-world distance information from a monocular image, according to one embodiment.

FIG. 1 is a diagram of a system capable of providing real-world distance information from a monocular image, according to one embodiment. The embodiments described herein address the technical problem of estimating how far specific objects in a given image are relative to the camera (e.g., images captured using a vehicle 101 on which a camera 103 is mounted). Any image is a projection of a three-dimensional (3D) scene onto a two-dimensional (2D) image plane (e.g., the camera sensor). This loss of dimensionality is encoded in the 2D image in the form of parallax—the observation that farther off objects appear smaller than objects close by. In one embodiment, by leveraging this encoded depth information, the system 100 of FIG. 1 introduces the capability to estimate the real-world distance or depth information of a given object from the camera by extracting the geometries encoded in the 2D image even when the image is a monocular image (e.g., a non-stereoscopic image with no additional 3D information other than parallax apparent in a single 2D image). Real-world distances or depths refer, for instance, to physical distances or depths to objects or features in the actual environment that are depicted in the image and are provided in standard distance or depth measurement units (e.g., meters).

Finding real-world distances or depths from images finds a lot of services applications ranging across 3D mapping, 3D reconstruction, augmented reality, autonomous driving, etc. For example, the real-world distance or depth information extracted from a single image according to the embodiments described herein can be provided to a services platform 105 comprising one or more services 107a-107n (also collectively referred to as services 107) that can use the depth information to perform one or more location-based functions. One function can include but is not limited to generating mapping data (e.g., feature distances and/or locations) that can be stored in a geographic database 109.

There are multiple traditional approaches for gathering depth information—but, most of them usually require expensive hardware like LiDAR scanners. A cheaper traditional approach involves performing 3D mapping from a sequence of images or from a continuous video stream such as the following:

Video Based—This traditional approach relies on a continuous stream of images in the form of a video to form a 3D perception of the surroundings. They rely on finding matching image features across sequential images and tracking the change in their image positions across frames to compute their 3D positionings relative to the camera. This traditional approach, however, requires processing multiple images in sequence, which makes this approach less amenable to parallelization to increase compute speeds or for processing large batches of images.

Stereo Image Based—This traditional approach requires stereo images which mandates a given scene be captured by two different cameras simultaneously. However, it can be more difficult and complex to provide stereo camera setups for many use cases.

Monocular Image Based—This traditional approach might utilize only one image, but the depths they output are not real-world dimensions. In other words, their depths are not in meters but in values which are a measure of the real depth. Transforming these depth estimates to exact real-world values is typically difficult and inaccurate as they do not usually map linearly to the real-world depths.

As noted above, the embodiments of the system 100 described herein addresses the technical problems and limitations of traditional approaches to provide real-world distances or depths of objects (e.g., in meters) by using only one single, monocular image as opposed to using multiple continuous frames from videos popularly used by traditional approaches. For example, under conventional approaches, using imagery to determine map attribute/feature placement generally requires use of multiple or stereoscopic images to determine the locations of objects depicted in the imagery with a level of accuracy needed for location-based services (e.g., mapping, navigation, etc.). In other words, determining distances to objects usually requires multiple images of objects taken from slightly different camera positions in order to accurately calculate the relative positions of the objects. When these conventional tools are not used the placement of detected features/attributes/objects from imagery is subjective and imprecise at best. On the other hand, when these conventional tools are used, they require multiple images and take more operator time. As a result, scaling these tools to for large-scale mapping can require significant resources, e.g., in terms of computer resources, manpower, etc.

Moreover, in many cases for many map service providers (e.g., providers operating a services platform 105 and/or any of the services 107a-107n, also collectively referred to as services 107), map attributes or features may only appear in a single image obtained from specialized mapping vehicles and/or participating crowd-sourced vehicles (e.g., a vehicle 101 on which a camera 103 is mounted to capture imagery of roadway or nearby environment). In this single image case, measurement of attribute/feature placement is highly subjective and dependent on the skill of any number of different individuals manually processing the imagery. As a result, conventional processes for map feature/attribute placement using single images or photographs often suffer from low levels of accuracy and reliability.

Given the high accuracy of the embodiments described herein, the embodiments can be combined with continuous-frame optimization techniques to further boost accuracy. The single-image advantage also allows the embodiments described herein to be highly parallelizable (multiple frames can be processed at once). In one embodiment, the system 100 leverages the parallax phenomena and the fact that when one looks down a street, the road appears to keep getting narrower with distance to compute real-world distance or depth information. The embodiments need very little input, are light-weight, highly parallelizable over videos and extensible to global optimization of depth estimates over image sequences for accuracy improvements.

The embodiments described herein can be generalized to any pose of the camera ((e.g., location, orientation or pointing direction, etc., which are automatically computed). The approaches described herein can also involve automatic computation of the bearing from the image by triangulating the vanishing point of the road done by analyzing the segmented image (e.g., a semantically segmented image) where the road is also identified. In one embodiment, the system 100 can process the image to output data such as but not limited to any of the following:
1. Real-world locations of objects/features depicted in the image (e.g., depth indicating a forward distance from the camera to the object/feature, and a horizontal or sideways distance from the camera to the object/feature);
2. Where the camera is moving towards (heading); and/or
3. Camera Pose (e.g., angles the camera makes with the X, Y & Z axes with an origin at the focal point or optical center of the camera) which can also be modelled as yaw pitch and roll of the camera.

FIGS. 2A and 2B are diagram illustrating example views of a camera orientation with respect to a road, according to one embodiment. These examples illustrate that a camera 201 (e.g., mounted on a vehicle—not shown) can be oriented in any direction with respect to the orientation of a road 203. The example of FIG. 2A illustrates the camera 201 and the road 203 from a top view. As shown, the camera 201 can be skewed (e.g., left or right) with respect from the direction of travel of the road 203. As a result, an image captured by the camera 201 at this location would also be skewed with respect to a vanishing point created by the road 203. The example of FIG. 2B illustrates the camera 201 and the road 203 from a side view. As shown, the camera 201 can also be skewed (e.g., up or down) with respect to a ground or surface plane of the road 203. In one embodiment, the embodiments described herein automatically compute the camera pose resulting from the skewing of the camera 201 from an image captured by the camera to facilitate computation of real-world distances or depths form the image.

In one embodiment, given an input pixelwise segmented image (e.g., semantically segmented on a pixel level by a computer vision system to classify each pixel as a road or non-road pixel), the system 100 can employ error-minimizing techniques to find both the vanishing point and (optionally) the optimum object-to-road snapping points to output a real-world location (e.g., depth and/or horizontal distance from the camera) for each object (e.g., pole-like objects or other features of interest) in the image. The system 100 is immune to the direction the camera is pointed towards (e.g., as illustrated in FIGS. 2A and 2B) as that is computed and automatically accounted for as described in the various embodiments below.

In traditional video-based approaches, each frame is processed sequentially—one after the other. This is because contextual cues from the previous frames are propagated to the next frame being processed to iteratively refine the 3D depth estimations being produced, hence constraining it to sequential processing (i.e., it is not very parallelizable). However, the frame independent nature of the embodiments described herein allows for simultaneous processing of multiple frames at once which can be an order of magnitude faster than sequential approaches. Furthermore, traditional video-based approaches typically subject their estimations to a global optimization step which makes fine adjustments to the 3D map to make it consistent across the various frames. The outputs of the embodiments described herein can also be directly fed into this optimization step to further boost the accuracy. Hence, the various embodiments described herein are faster, cheaper, more robust, more accurate, and more easily extensible that traditional approaches.

In one embodiment, the system 100 uses simple assumptions which are easy to estimate and/or obtain to translate this technical problem of depth estimation from a single image (e.g., a single monocular image) to a geometry problem. By way of example, the inputs to the system 100 include the estimates of camera height, camera focal length, camera field of view, and/or the segmented input image. The segmented image is assumed to have pixel-wise labels for the road and any objects or features of interest in the image.

Figure 3:
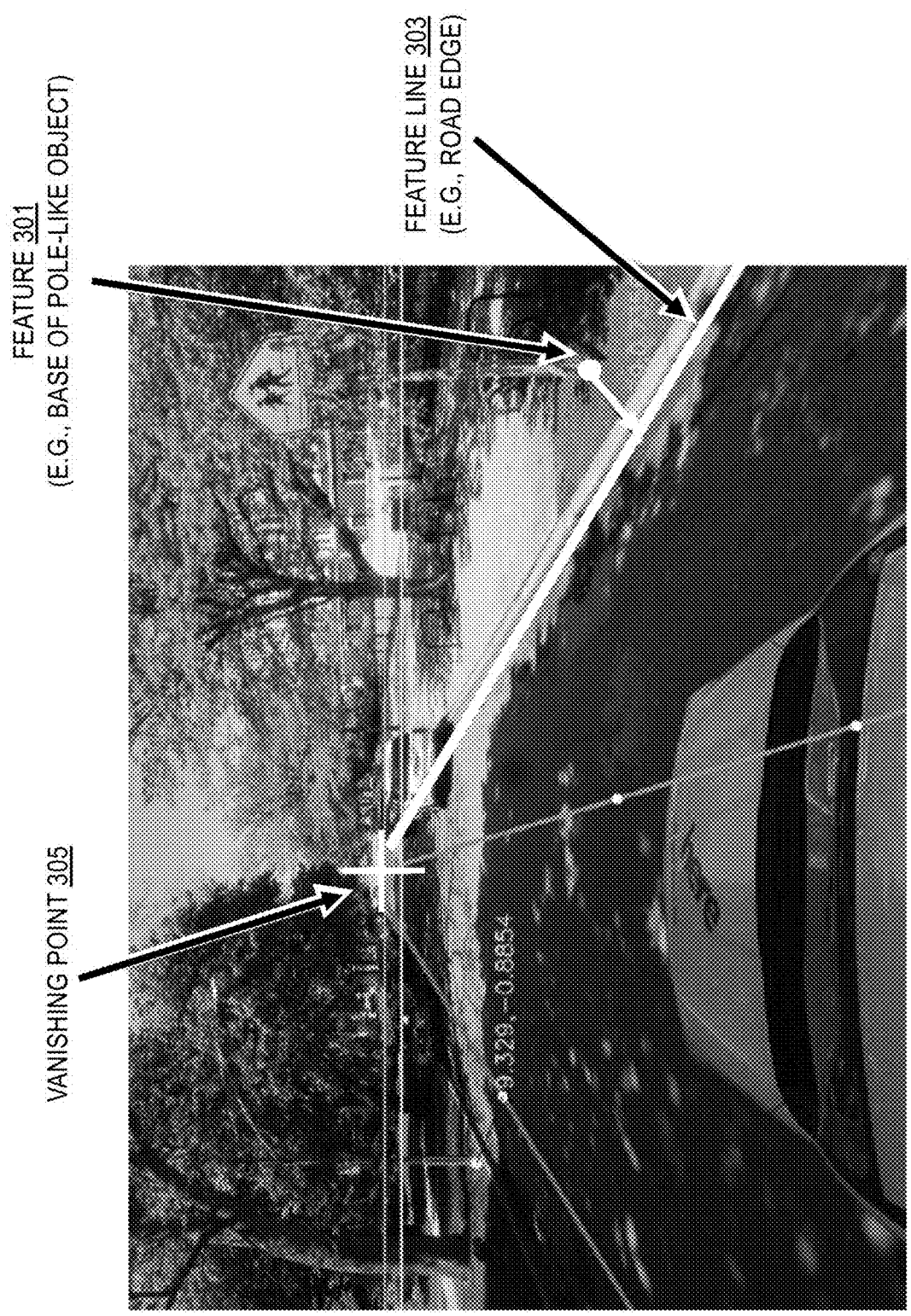
FIG. 3 is a diagram illustrating an example providing real-world distances from a monocular image, according to embodiment.

In one embodiment, as shown in FIG. 3, the system 100 analyzes the segmented image to see how the contour of the road changes going towards the top of the image. Leveraging the phenomena that roads appear to "vanish-off" near the horizon, the system 100 finds the distances of various objects or features 301 by projecting their camera or image positions to an imaginary line (e.g., a feature line 303) running along the side of the road where the object or feature 303 is placed (or through the object or feature 301 itself) connecting the road's vanishing point 305. This vanishing point 305 lies at infinite distance, at the horizon.

Furthermore, once this vanishing point is found, the system 100 uses the vanishing point to estimate the camera pose (e.g., angles the camera makes with the X, Y & Z axes). This is one of the main reasons why the system 100 does not need the image plane to be perfectly perpendicular to the road and the camera may point at any direction as long as the vanishing point is still visible in the frame. This computed camera pose is then used to project and adjust the location of objects/features of interest in the image (e.g., bases of all the pole like objects) for their actual or real-world localization based on a derived scene geometry with a reference point being at the focal point of the camera. In one embodiment, a pinhole camera model is assumed.

By enabling the estimation of real-world distances or depths from a single image, the embodiments described herein provided for several technical advantages including but not limited to:

1. The embodiments need only one image to work as opposed to continuous video stream and/or special stereo images needed by existing approaches.
2. The embodiments generate a prediction of real-world depths instead of depth "estimates" (a representation of depth but not the exact depth) as produced by traditional approaches.
3. The embodiments are lightweight and computationally very cheap. Can be easily deployed to mobile phones.
4. Prediction error generally is less than 1 meter which is quite surprising given that only one image is being used.
5. The embodiments do not need the camera or image plane to be perfectly perpendicular to the ground and the camera can point at any direction as long as the infinity or vanishing point is visible in the image.
6. The embodiments automatically find the interest points (points for which distances need to be computed) and camera pose coupled with the infinity or vanishing point.
7. The embodiments are extensible to video-based methods which perform continuity-aware optimizations to further refine the positioning estimates, except that in this approach, all images may be processed parallelly at once (as there is no loop carried dependency) before being subject to global optimization. Hence, this should be an order of magnitude faster than existing approaches in this setting.

It is noted that the various embodiments described herein are generally discussed with respect to providing distance markers for terrestrial vehicles 101 (e.g., cars, trucks, trains, buses, etc.) where the ground or surface plane represents the ground surface on which the vehicle 101 travels. However, it is contemplated that the embodiments described herein are also applicable to vehicles that travel through media other than terrestrial media, such as but not limited to aerial vehicles (e.g., drones, planes, etc.) and marine vehicles (e.g., surface ships, submarines, etc.). In the case of other media, the ground plane can correspond a plane extending in along the direction of travel through a reference point on the vehicle 101 (e.g., a centerline, the bottom most point, top most point, etc.). For example, for an aerial drone traveling, the ground level is can be the centerline of the drone with the camera 103 mounted either above or below the centerline. For a surface ship, the ground plane can be the surface of the water with the camera mounted either above or below the water.

Figure 4:
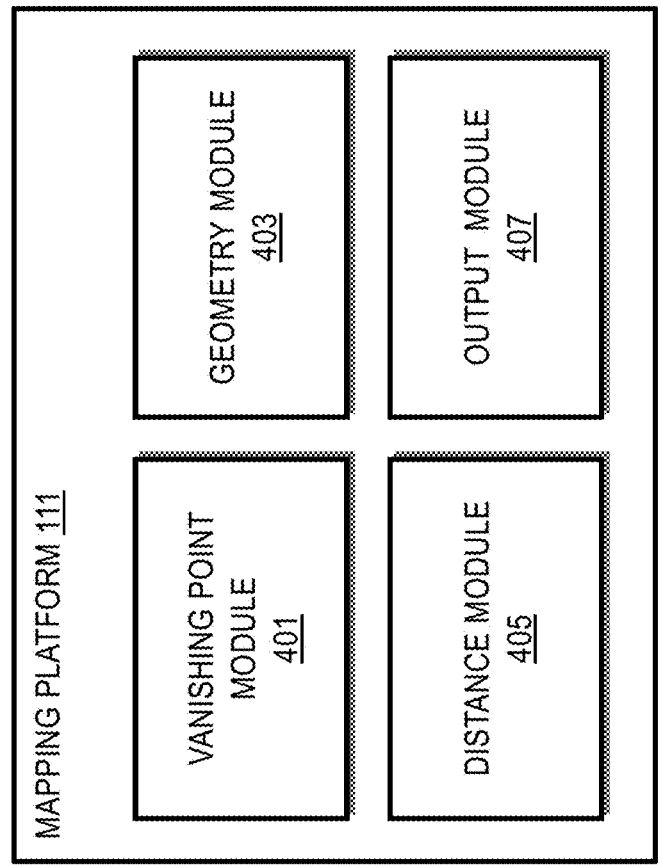
FIG. 4 is a diagram of the components of a mapping platform for providing real-world distances from a monocular image, according to one embodiment.

In one embodiment, the system 100 can include a mapping platform 111 for providing real-world distance or depth information from a monocular image according to the embodiments described herein. As shown in FIG. 4, the mapping platform 111 includes one or more components such as a vanishing point module 401, a geometry module 403, a distance module 405, and an output module 407. The above presented modules and components of the mapping platform 111 can be implemented in hardware, firmware, software, or a combination thereof. It is contemplated that the functions of these components may be combined or performed by other components of equivalent functionality. Though depicted as a separate entity in FIG. 1, it is contemplated the mapping platform 111 may be implemented as a module of any of the components of the system 100. In another embodiment, the mapping platform 111 and/or any of the modules 401-407 may be implemented as a cloud-based service, local service, native application, or combination thereof. The functions of the mapping platform 111 and/or the modules 401-407 are discussed with respect to FIGS. 5-15 below.

Figure 5:
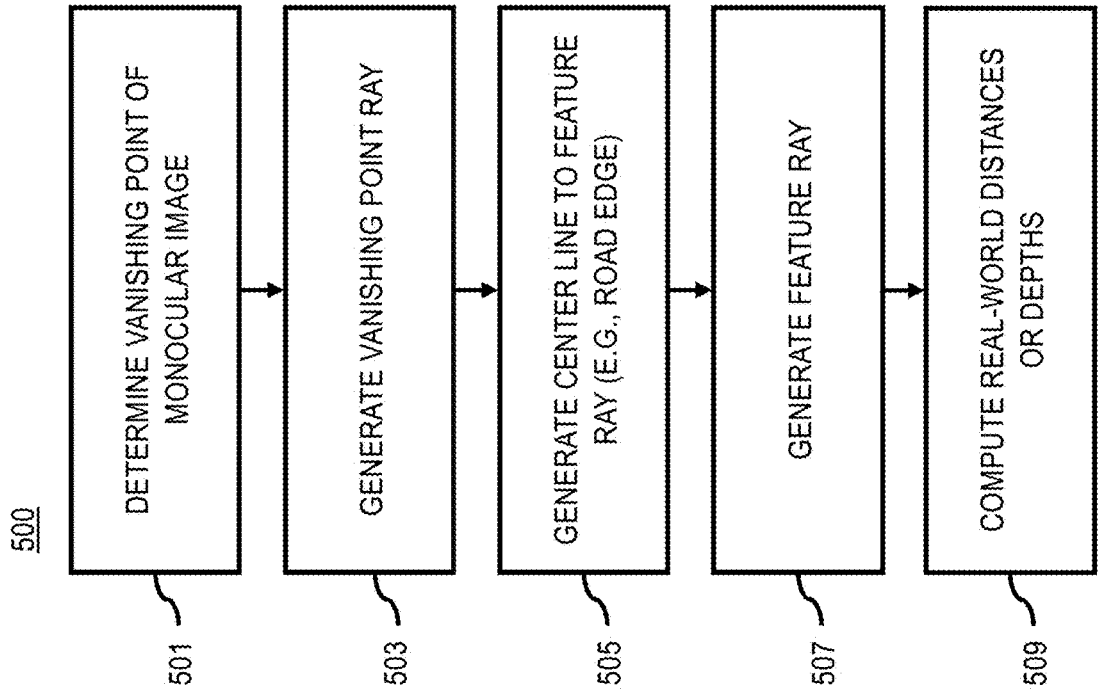
FIG. 5 is a flowchart of a process for providing real-world distance information from a monocular image, according to one embodiment.
Figure 17:
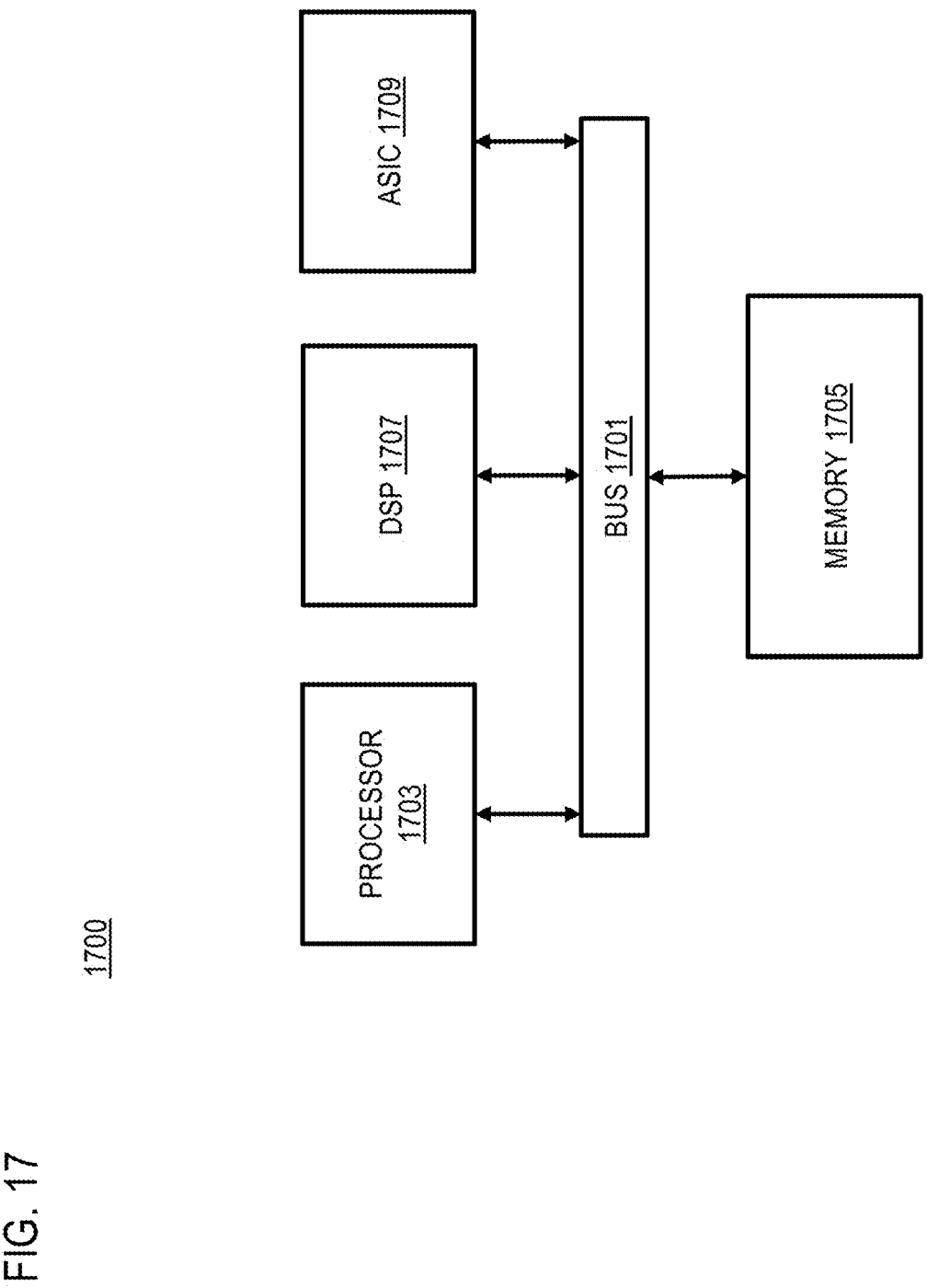
FIG. 17 is a diagram of a chip set that can be used to implement an embodiment.

FIG. 5 is a flowchart of a process for providing real-world distance information from a monocular image, according to one embodiment. In various embodiments, the mapping platform 111 and/or any of the modules 401-407 may perform one or more portions of the process 500 and may be implemented in, for instance, a chip set including a processor and a memory as shown in FIG. 17. As such, the mapping platform 111 and/or any of the modules 401-407 can provide means for accomplishing various parts of the process 500, as well as means for accomplishing embodiments of other processes described herein in conjunction with other components of the system 100. Although the process 500 is illustrated and described as a sequence of steps, its contemplated that various embodiments of the process 500 may be performed in any order or combination and need not include all of the illustrated steps.

The process 500 assumes that the mapping platform 111 has received or has otherwise been provided with an image that is to be processed to determine depth or distance information. In one embodiment, the image is a single image that is monocular (e.g., captured with a single perspective with no corresponding stereoscopic image). In the case of a stereoscopic image, each image of the stereoscopic pair of images can be separated and processed as a de facto monocular image.

In step 501, the vanishing point module 401 determines a vanishing point of the image captured. It is contemplated that the vanishing point module 401 can use any means for determining the vanishing point including but not limited to extracting the vanishing point from the image, using sensor data (e.g., horizon sensor data) associated with the image, and/or the like. In one embodiment, the vanishing point module 401 can use the process 600 of FIG. 6 to determine the vanishing point of the image. It is noted that the process 600 is provided by way of illustration and not as a limitation with respect to estimating real-world distance or depth information from a single image. In addition, it is contemplated that the process 600 of FIG. 6 as a standalone process for determining a vanishing point without having to also estimate real-world distances or depths. Embodiments of the process 600 are described as follows.

Figure 6:
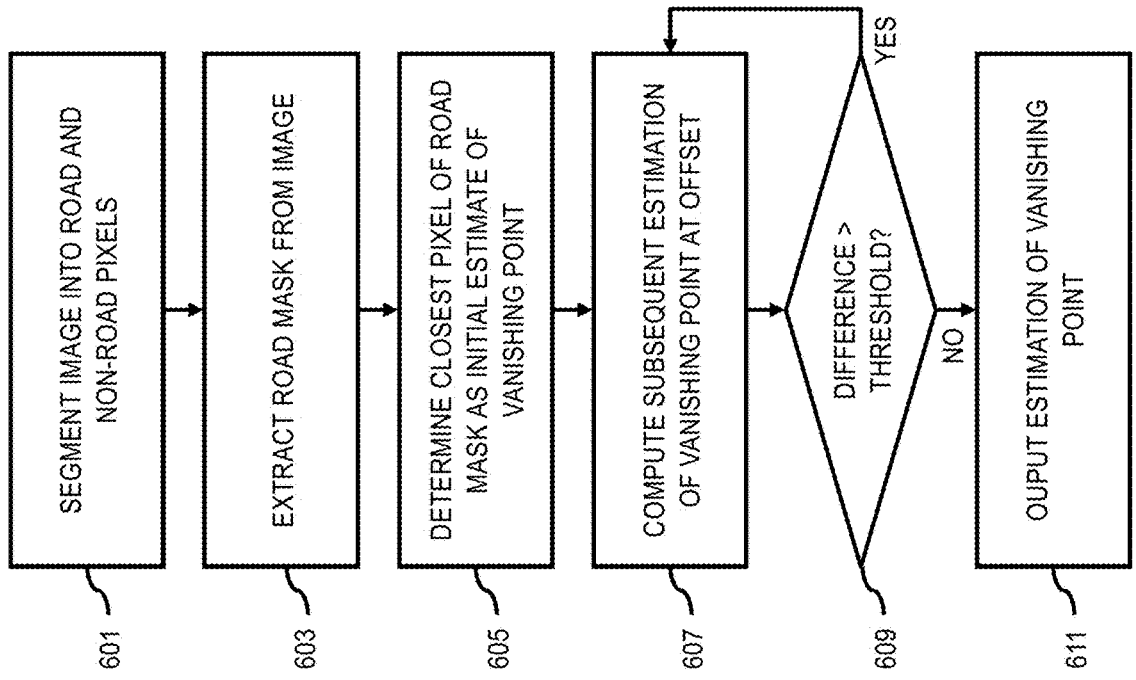
FIG. 6 is a flowchart of a process for estimating a vanishing point in an image, according to one embodiment.

FIG. 6 is a flowchart of a process for estimating a vanishing point in an image, according to one embodiment. In various embodiments, the mapping platform 111 and/or any of the modules 401-407 may perform one or more portions of the process 600 and may be implemented in, for instance, a chip set including a processor and a memory as shown in FIG. 17. As such, the mapping platform 111 and/or any of the modules 401-407 can provide means for accomplishing various parts of the process 600, as well as means for accomplishing embodiments of other processes described herein in conjunction with other components of the system 100. Although the process 600 is illustrated and described as a sequence of steps, its contemplated that various embodiments of the process 600 may be performed in any order or combination and need not include all of the illustrated steps.

Figure 7A:
FIGS. 7A-7H illustrate an example semantic segmentation of a monocular street image for determining a vanishing point, according to one embodiment.

In step 601, the vanishing point module 401 segments or otherwise receives a segmented version of the image of the interest that classifies the pixels of the image into road pixels and non-road pixels. In one embodiment, the image can also be segmented to identify other potential features or objects of interest (e.g., the bases of pole-like objects such as but not limited to signs, traffic poles, trees, etc.). The segmentation can be performed using a computer vision system (e.g., employing a machine learning based object or feature detector) to classify and label the pixels of the images as depicting a road or a non-road feature. For example, FIG. 7A illustrates an example input image 701 (e.g., a single monocular image) of a street view of a road and surrounding environment. As shown, the image 701 is not looking straight down the road, but slightly to the left of travel direction of the road—the embodiments described herein will automatically account for this.

Figure 7B:
Figure 7C:

FIG. 7B illustrates a segmented image 711 after semantic segmentation is application to the image 701 of FIG. 7A to generate pixelwise labels of road and non-road pixels of the image 701. As shown in FIG. 7B, the image segment 713 represents the pixels of the image 701 that have been classified as corresponding to a road. FIG. 7B illustrates a segmented image 711 that results from semantic segmentation of the image 701 to identify road and non-road features (e.g., according to step 601). The shaded segment 713 of the segmented image 711 indicates pixels labeled as corresponding to a road, while other segments (e.g., indicated by shaded areas other than the shaded segment 713) correspond to other non-road features or objects.

In one embodiment, the vanishing point module 401 then analyzes the segmented image 711 to find the infinity point (or vanishing point)—a point in the image from where it is assumed the light rays are coming from infinity or the horizon. In one embodiment, this is done by processing the polygon pertaining to the road in the image. For example, in step 603, the vanishing point module 401 initiates an extraction of a road mask from the segmented image. The extraction process includes, for instance filtering, the segmented image 711 to selected only the pixels labeled as road pixels (e.g., the shaded segment 713) to construct to road mask 721 of FIG. 7C as a binary image comprising: (1) black pixels indicating road pixels, and (2) white pixels indicating non-road pixels. It is noted that the example of designating the road mask 721 using white and black pixels is provided by way of illustration and not as a limitation. The vanishing point module 401 can use any means to differentiate road and non-road pixels in the road mask 721.

Figure 7D:

In step 605, the vanishing point module 401 determines an initial estimate of the vanishing point using the road mask 721. In one embodiment, to determine the initial estimate, the vanishing point module 401 finds the pixel of the road mask 721 that is closest to the horizon in the image (e.g., typically the horizon will be at some horizontal line in the image). If the pixel coordinate system begins with pixel (0,0) in the upper left corner of the image, the pixel would be the black pixel of the road mask 721 having the lowest y-coordinate (i.e., "highest" point or pixel of the road mask closest to the horizon) as shown in FIG. 7D. The vanishing point module 401 provides this closest pixel as the initial estimate of the vanishing point 723. In one embodiment, this initial vanishing point estimate 723 enables the vanishing point module 401 to obtain a polygon pertaining to the vertices spanning across the road mask 721 region.

Following this, in step 607, the vanishing point module 401 iteratively computes a subsequent estimation of the vanishing point at an offset from the initial estimation or a previous estimation of the vanishing point until a difference between the initial estimation or the previous estimation and the subsequent estimation is below a threshold value. For example, the vanishing point module 401 can find the left and right lines running along the road edges using the road mask 721. These lines are estimates of the road lines forming the edges of the road represented in the road mask 721.

Figure 7E:
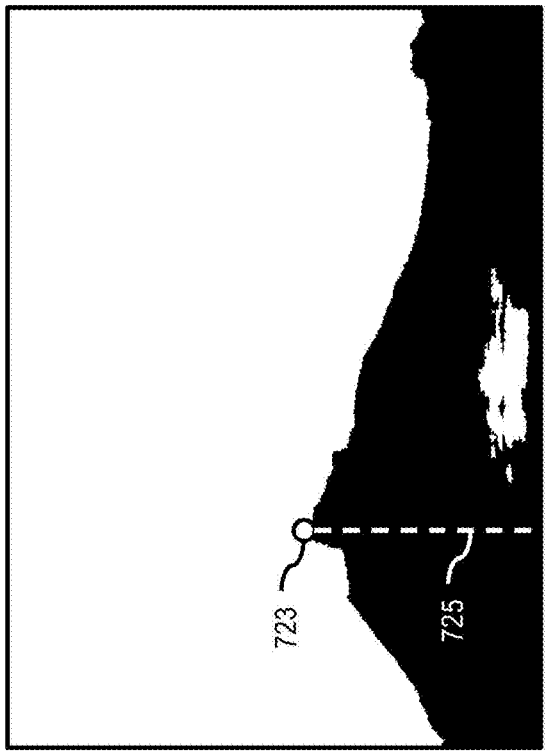
Figure 7F:
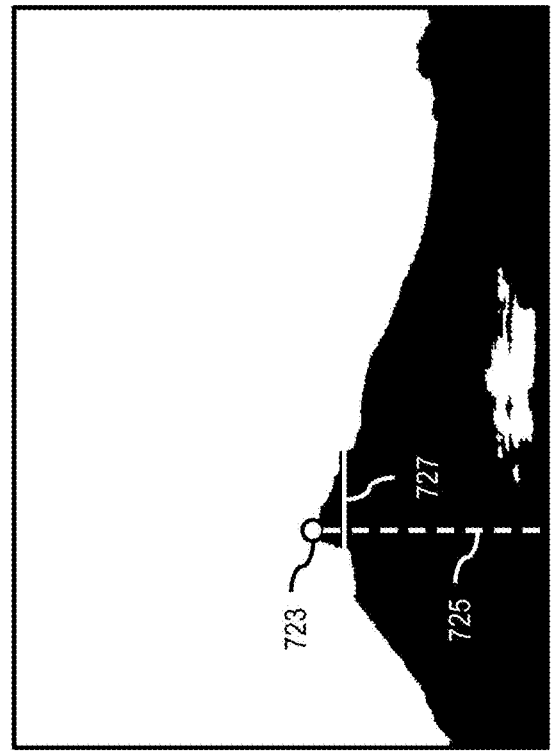

In one embodiment, an approximation of the points of termination of the road-line is estimated from the initial approximation of the vanishing point. For example, using the initial estimate of the vanishing point, the vanishing point module 401 can find the left and right ending point of the road lines by first drawing a vertical line 725 from the initial estimate of the vanishing point 723 to the base of the image as shown in FIG. 7E. This vertical line 725 is divided by a factor (e.g., usually 80 for a typical image size, called y_margin_denominator) to obtain an offset from the initial vanishing point estimate 723 and a horizontal line 727 is drawn through it as shown in FIG. 7F.

Figure 7G:
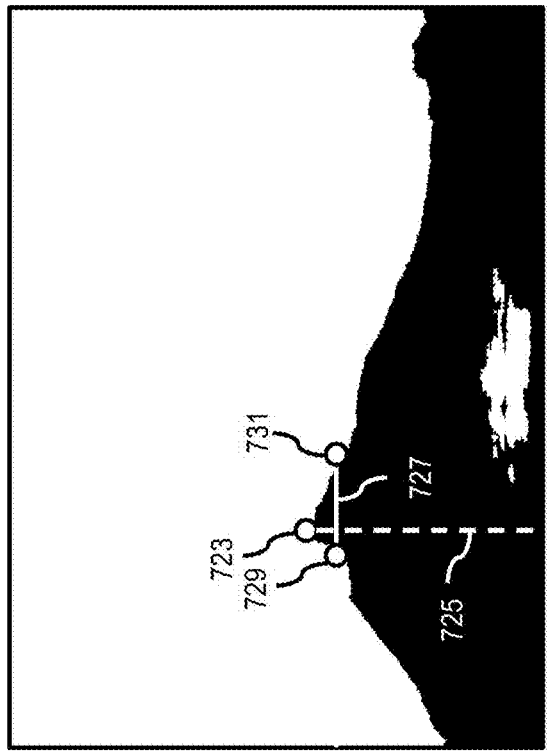
Figure 7H:
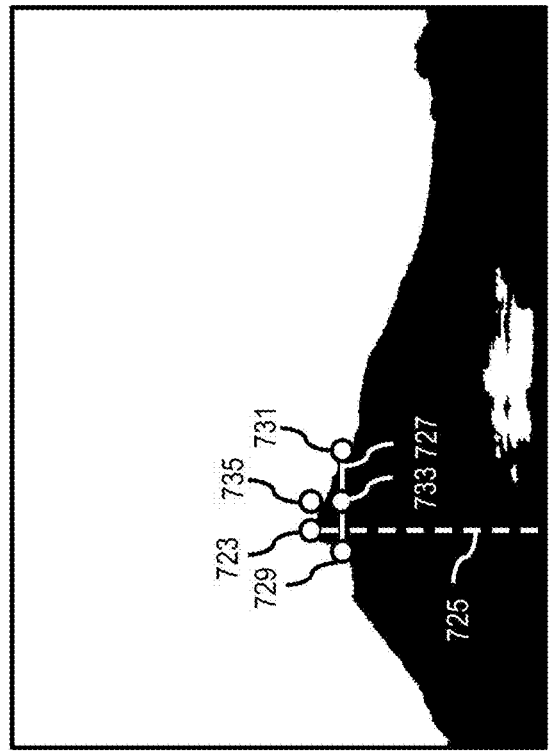
Figure 8:
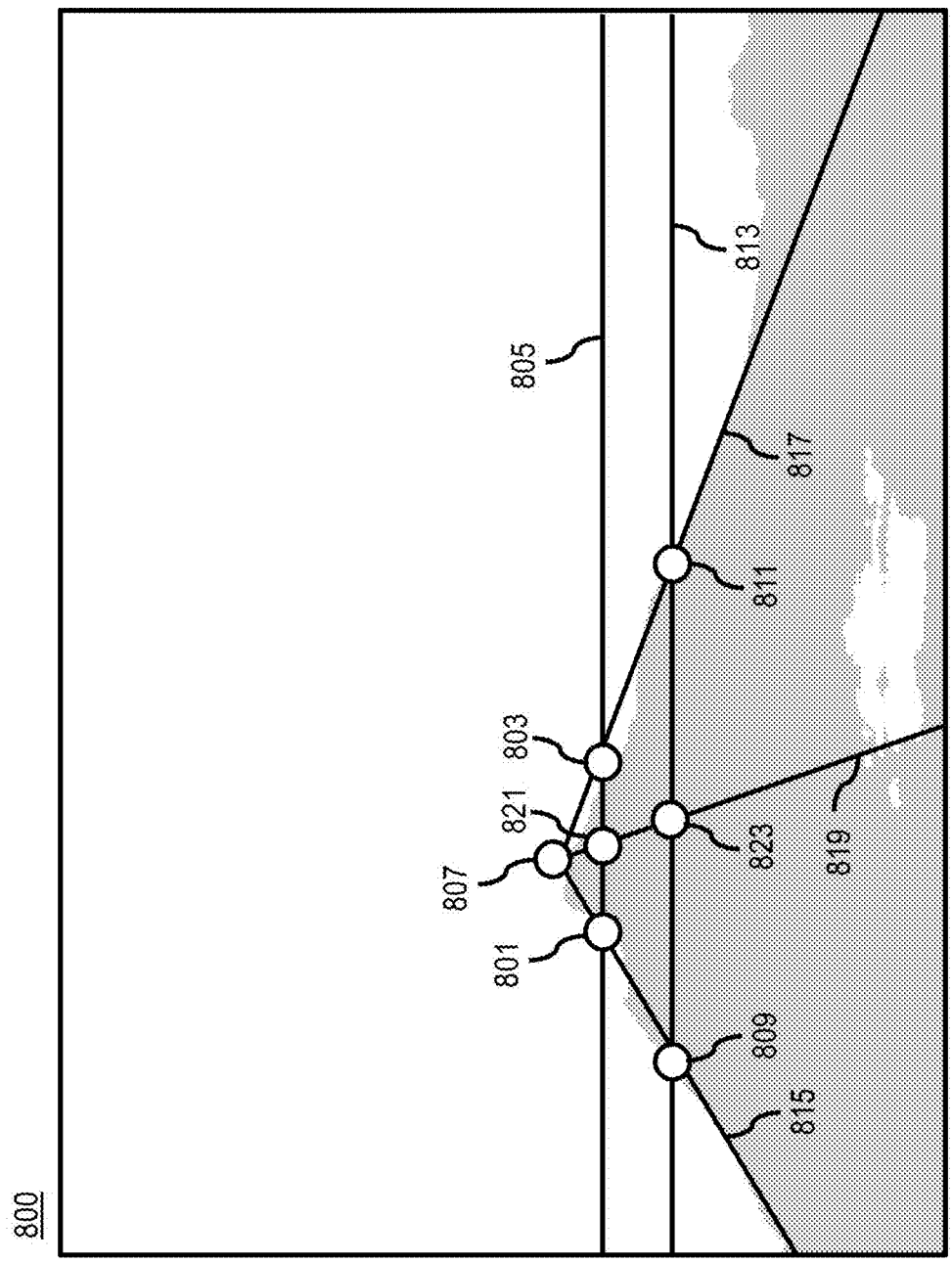
FIG. 8 is a diagram illustrating an example of determining road edges in a monocular street image, according to one embodiment.

Next, the vanishing point module 401 can determine the left road line point 729 and right road line point 731 as the respective locations where the horizontal line 727 (e.g., offset line) intersects the edges of road mask 721 (e.g., the road mask polygon) as shown in FIG. 7G. Once these points 729 and 731 are obtained, the vanishing point module 401 computes the mid-point 733 of the horizontal line 727 joining these two points as shown in FIG. 7H.

In one embodiment, the vanishing point module 401 can denote the image coordinates of this mid-point 733 as $x_h, y_h$. Assuming that the initial estimated vanishing point 723 has the coordinate $x_v, y_v$, the vanishing point module 401 obtains a new or subsequent point 735 with the coordinate $x_h, y_v$ on a horizontal line running through the initial estimated vanishing point 723 as shown in FIG. 7H. This point at coordinate $x_h$, is then provided as the new or subsequent estimate of the vanishing point.

In one embodiment, a measure of "error" is obtained from this subsequent estimation of the vanishing point which is minimized to converge on the final vanishing point estimate. This error, for instance, can be the Euclidean distance or any other computed distance metric between the new/subsequent vanishing point and the previous estimate. The vanishing point module 401 can then minimize this error by repeating the whole process iteratively and obtaining new or subsequent estimates of the road line end-points and the central vanishing point until the error falls below a certain threshold (step 609). This error generally converges very fast to until a final estimation of the vanishing point is obtained. In step 611, once the error is below the threshold value, the vanishing point module 401 then provides the final estimation of the vanishing point as an output (e.g., an output for determining real-world distances and/or depths according to the embodiments described herein).

In one embodiment, the vanishing point module 401 can also determine or compute road lines corresponding to the edges and/or center of the road depicted in the road mask 721. For example, the vanishing point module 401 can repeat the process 600 to obtain multiple sets of road-line endpoints at different offsets along the road mask 721. As shown in the example 800 of FIG. 8, the vanishing point module 401 can obtain a first set comprising a left road-line endpoint 801 and a right road-line endpoint 803 at a first offset 805 from the vanishing point 807 (e.g., using the same or different y_margin_denominator used for estimating the vanishing point such as 30). The vanishing point module can then obtain another set of road-line endpoints 809 and 811 at another offset 813 from the vanishing point 807. The first set of endpoints 801 and 803 and the second set of endpoints 809 and 811 are subsequently used to obtain the full road-lines running along the road edges by extrapolating them geometrically. For example, left road line 815 can be extrapolated by creating a line between left endpoints 801 and 809, and right road line 817 can be extrapolated by creating a line between right endpoints 803 and 811.

In one embodiment, using these two road lines 815 and 817, the vanishing point module 401 can also compute a central road line 819 which passes through the center of the road. The central road line 819 can be constructed using the midpoint 821 obtained from the first set of endpoints 801 and 803, and the midpoint 823 from the second set of endpoints 809 and 811.

Figure 9:
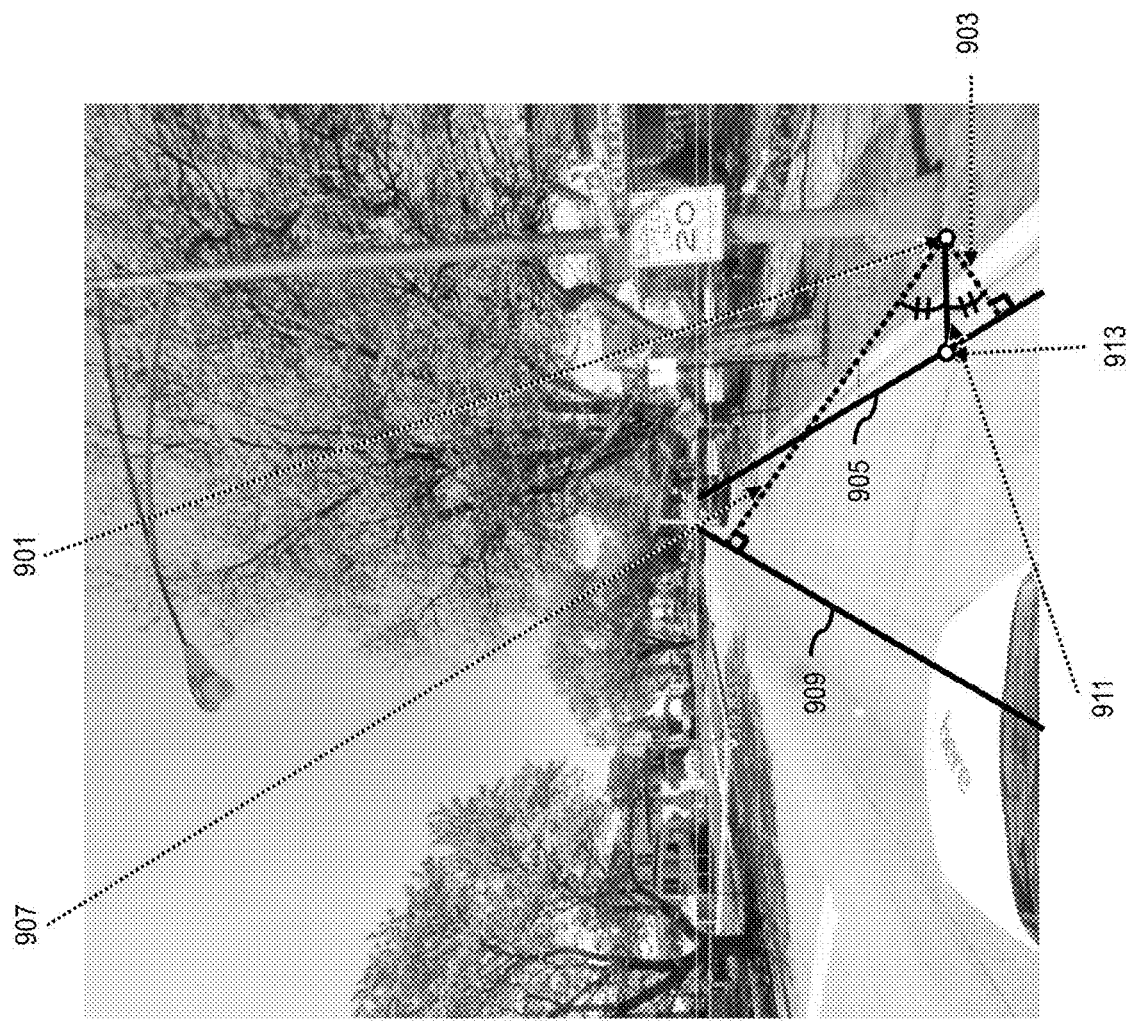
FIG. 9 is a diagram illustrating an example of mapping a feature to a road edge, according to one embodiment.

In one embodiment, the central road line 819 can be used to map features of interest (e.g., bases of pole-like objects) near the road edges to a point on the road-edge line. The vanishing point module 401 can perform the mapping of the features of interest (e.g., pole-bases) to the either of the road lines 815 or 817 by using simple geometry as follows:

a. From a point location of the feature of interest (e.g., a point on the base of the pole-object) depicted in the input image, the geometry module 403 can draw two lines: one line intersecting the road edge line and perpendicular to it, and another line intersecting the central road line and perpendicular to it. FIG. 9 illustrates an example in the point location 901 of the base of traffic light pole is the feature of interest. The geometry module 401 draws a first line 903 from the point location 901 that intersects and is perpendicular to the right edge road line 905, and draws a second line 907 that intersects and is perpendicular to the central road line 909.

b. After this, the geometry module 403 draws an angle bisector 911 which bisects the angle between the two lines 903 and 907. The point location 901 of the feature of interest is then mapped to the point 913 on the right edge road line 905 where the angle bisector 911 intersects it.

c. The embodiments of feature mapping described above ensures that the features or objects of interest are correctly mapped to the road lines with minimum effect from changes in camera pose (which, e.g., is especially prominent when a vehicle turns around corners).

In one embodiment, once the optional embodiments of computing the vanishing point, road lines, and/or feature mappings have concluded, the mapping platform 111 returns to the process 500 of FIG. 5 to compute the real-world distances or depths from the image coordinates of these points. For example, in step 503, the geometry module 403 initiates the computation by generating a vanishing point ray from an optical center of the camera through the vanishing point on an image plane of the monocular image to infinity (step 503). This and other computations associated with embodiments of the process 500 are explained with respect to FIG. 10 which depicts a schematic of a typical street image from a top view assuming a pin-hole camera model.

Figure 10:
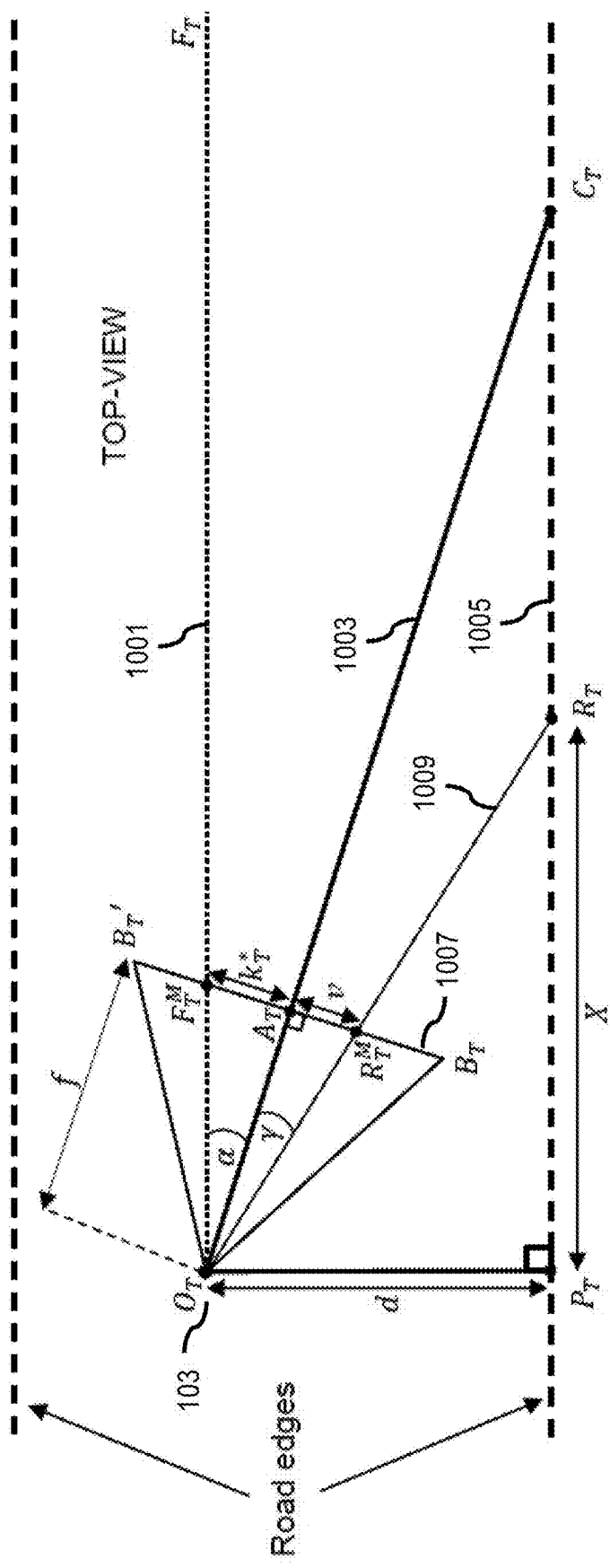
FIG. 10 is a diagram illustrating a top view of a geometric arrangement of an image plane of a monocular image for providing real-world distance, according to one embodiment.

As shown in FIG. 10, triangle $O_T B_T B_T'$ represents the camera 103 (e.g., a pin-hole camera) with rays originating from the infinity point $F_T$ (e.g., vanishing point ray 1001). The optical center of the camera 103 is at $O_T$. The line $O_T C_T$ represents the line passing through the geometric center of the camera lens and the optical center $O_T$ (e.g., the center line ray 1003). In one embodiment, the geometry module 403 generates the center line ray 1003 from the optical center of the camera through a geometric center of the image plane to a feature line 1005 (step 505). Generally, the feature line 1005 is parallel to the vanishing point ray 1001 at a horizontal or lateral distance corresponding to a feature location of a feature depicted in the monocular image. For example, the geometry module 403 can generate the feature ray 1009 from the optical center of the camera through a feature pixel location of the feature on the image plane to the feature location on the feature line 1005 (step 507).

Since the example of FIG. 10 is the top-view, the distance of the camera 103 from a feature line 1005 on which the feature of interest is located or mapped is designated as d. For example, the feature line 1005 can be a road edge on which the feature or object of interest (e.g., base of a pole like object) is mapped (e.g., as described with respect to embodiments of the process 600 above) or otherwise located. In cases where the feature line 1005 is the road edge (e.g., as shown in FIG. 10), the feature line 1005 is synonymous with the road edge line. In other words, the distance d represents the physical horizontal or lateral distance of the feature from the optical center of the camera 103 and is one real-world distance that is calculated from the single input image according to the embodiments described herein.

As shown in FIG. 10, the feature or object (e.g., base of a pole-like object) is assumed to be at $R_T$ and the light rays (e.g., the feature ray 1009) emanating from this point intersects the image plane at $R_T^M$ on its way towards the optical center of the camera 103. The length $R_T^M A_T$ (known as v) is the physical horizontal distance (along the X-axis in image coordinates) in meters between the pixel corresponding to $R_T^M$ and a vertical line running through the center of the image on the image plane 1007. As shown in FIG. 10, f is the focal length of the camera 103.

The vanishing point ray 1001 coming from the infinity point $F_T$ intersects the image plane 1007 at $F_T^M$ and $k^*_T$ is the physical horizontal distance in meters between the pixel corresponding to $F_T^M$ and the vertical line running through the center of the image on the image plane 1007. Angle α is the horizontal angle made by the vanishing point ray 1001 coming from infinity with the center line ray 1003 coming from the geometric center of the image plane 1007. The angle $\angle B_T O_T B_T'$ is the horizontal field of view of the camera 103.

Figure 11:
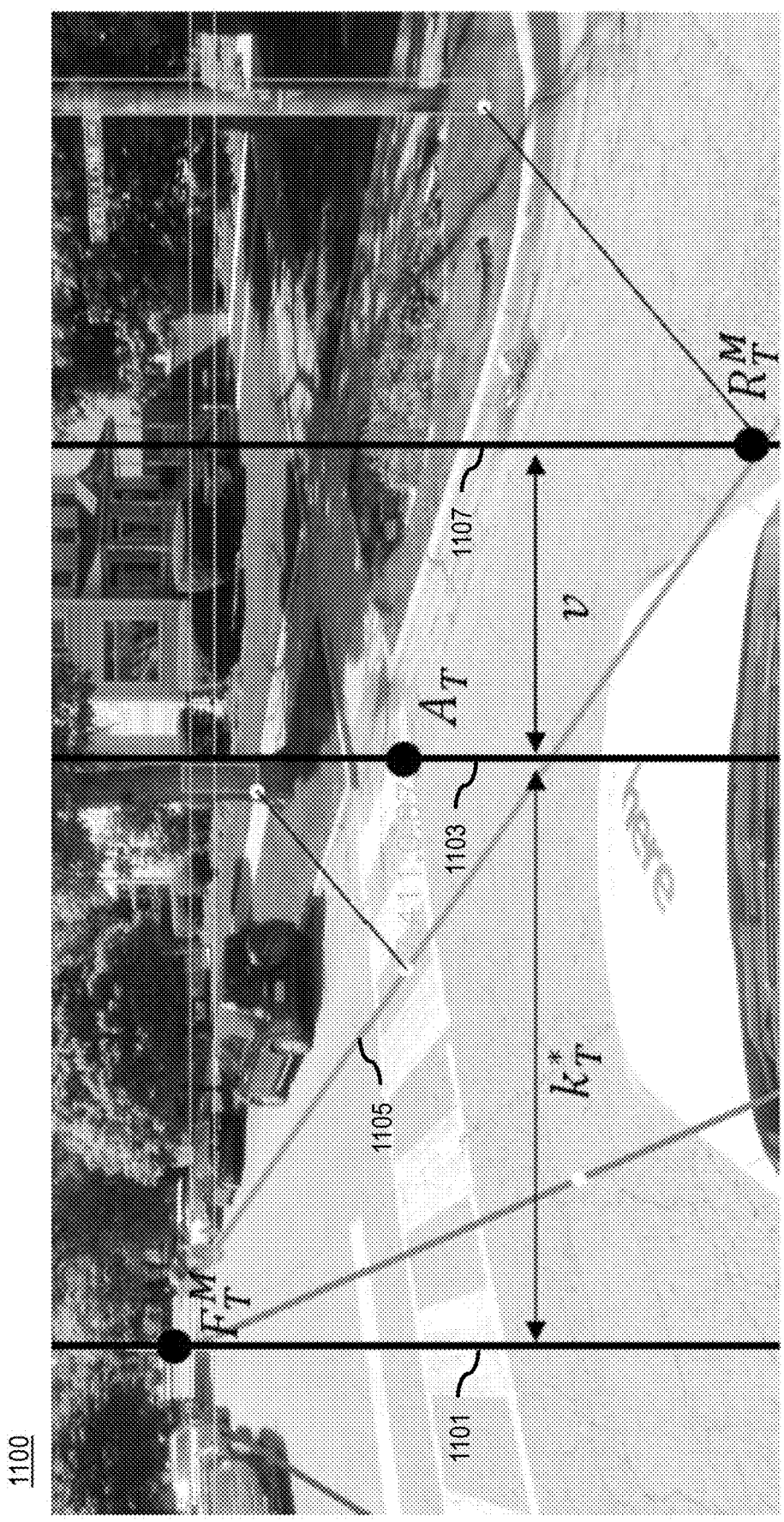
FIG. 11 is an example monocular street image overlaid with the geometric arrangement of FIG. 10, according to one embodiment.

To put things in perspective of the image, these points are illustrated in the image plane on an example image 1100 of FIG. 11. In this example, the rays, points, etc. defined above are projected onto the image plane of the image 1100. This projection of the 3D rays onto the 2D image plane results in the following: (1) the vanishing point ray 1001 of FIG. 10 is shown as vanishing point ray 1101 of FIG. 11, (2) the center line ray 1003 of FIG. 10 is shown as center line ray 1103 of FIG. 11, (3) the feature line 1005 of FIG. 10 is shown as feature line 1105 of FIG. 11, and (4) the feature ray 1009 of FIG. 10 is shown as feature ray 1107 of FIG. 11. All other variables and labels that are shown in FIG. 11 are equivalent to their counterparts indicated in FIG. 10.

Figure 12:
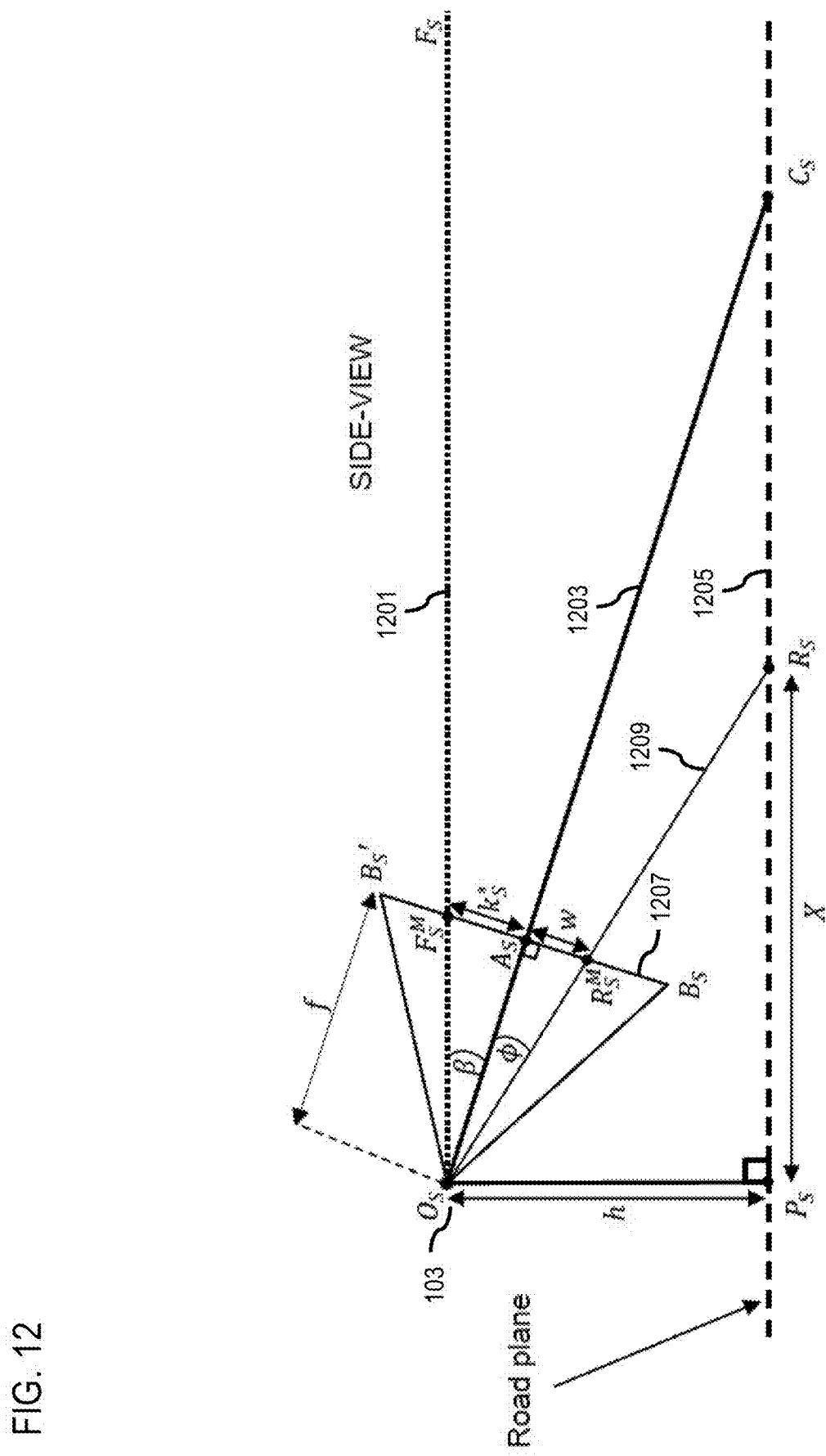
FIG. 12 is a diagram illustrating a side view of a geometric arrangement of an image plane of a monocular image for providing real-world distance, according to one embodiment.

In one embodiment, a similar diagram can be drawn for the side view as shown in FIG. 12 by repeating steps 503-507 for the side view. In the example of FIG. 12, the same top view scene of FIG. 10 is shown from a side view perspective. As shown, triangle $O_S B_S B_S'$ represents the camera 103 (e.g., a pin-hole camera) with rays originating from the infinity point $F_S$ towards the optical center of the camera 103 (e.g., a vanishing point ray 1201). The optical center of the camera is at $O_S$. The line $O_S C_S$ represents a center line ray 1203 passing through the geometric center of the camera lens and the optical center $O_S$. Since this is the side-view, the height of the camera 103 from the ground is shown as h.

The object of interest (e.g., a base of a pole-like object) has been assumed to be at $R_S$ on the surface plane 1205 (e.g., a road plane), and the light rays emanating from this point on the surface plane 1205 intersects the image plane 1207 at $R_S^M$ (e.g., feature ray 1209). The length $R_S^M A_S$ (known as w) is the physical horizontal distance (along the X-axis in image coordinates) in meters between the pixel corresponding to $R_S^M$ and the horizontal line running through the center of the image on the image plane 1207. As shown in FIG. 12, f is the focal length of the camera 103.

The vanishing point ray 1201 coming from the infinity point $F_S$ intersects the image plane 1207 at $F_S^M$, and $k*_S$ is the physical vertical distance in meters between the pixel corresponding to $F_S^M$ and horizontal line running through the center of the image on the image plane 1207. Angle β is the vertical angle made by the vanishing point ray 1201 coming from infinity with the center line ray 1203 coming from the geometric center of the image plane 1207. The angle $\angle B_S O_S B_S'$ is the horizontal field of view of the camera 103.

Figure 13:
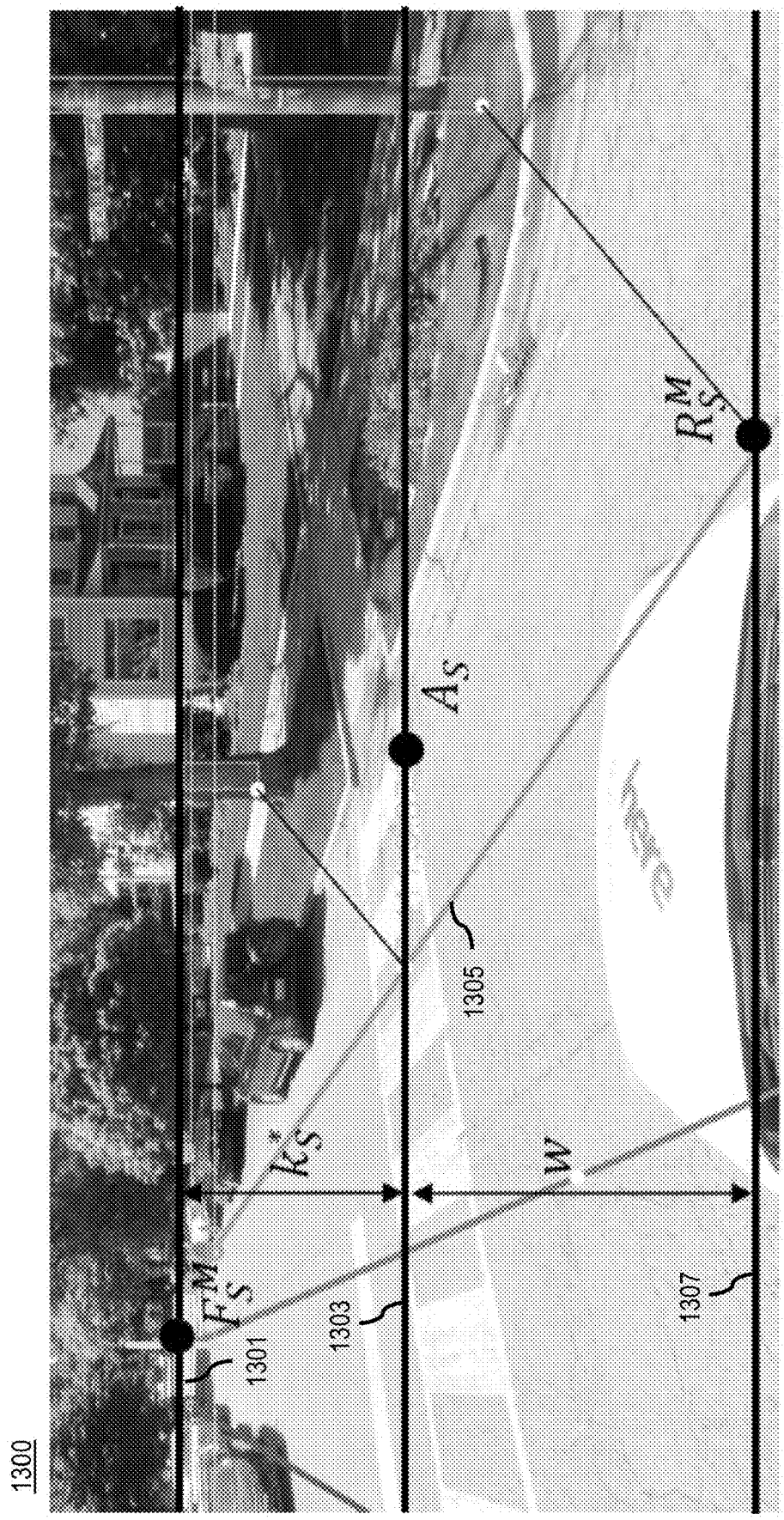
FIG. 13 is an example monocular street image overlaid with the geometric arrangement of FIG. 12, according to one embodiment.

FIG. 13 is an example image 1300 in which the quantities described in the side view of FIG. 12 are visualized on the image plane of the image 1300. The side view projections of the rays result in horizontal projected lines in contrast to the vertical projected lines of the top view projections. As with the example of FIG. 11, the quantities are projected into the 2D image plane from the 3D rays and other quantities as follows: (1) the vanishing point ray 1201 of FIG. 12 is shown as vanishing point ray 1301 of FIG. 13, (2) the center line ray 1203 of FIG. 12 is shown as center line ray 1303 of FIG. 13, (3) the point $R_S$ on the surface plane 1205 of FIG. 12 is shown as surface line 1305 of FIG. 13, and (4) the feature ray 1209 of FIG. 12 is shown as feature ray 1307 of FIG. 13. All other variables and labels that are shown in FIG. 13 are equivalent to their counterparts indicated in FIG. 12.

In step 509, the distance module 405 can take the geometric output of the embodiments describe above to compute the real-world or physical distances or depths of the features or objects of interest in the single input image (e.g., monocular image). In one embodiment, the physical distances in the image plane (e.g., indicated by the quantities v, w, $k*_T$, $k*_S$ in the top view and side view figures) can be computed from their pixel-wise distance based on a known sensor size. The known sensor size in turn can be computed based on the known field of view and the focal length of the camera 103.

In other words, the distance module 405 can compute the horizontal distance, a depth, or a combination of the feature location based on image coordinate data corresponding the vanishing point ray, the center line ray, the feature ray, one or more angles derived therefrom, and a known pixel-wise distance of the monocular image. In one embodiment, the distances or depths can be computed using both the top and side view geometries according to the derivation described below or equivalent. The objective of the derivation is to calculate the variables X (depth of a feature of interest) and d (horizontal or lateral distance of a feature of interest) with respect to the optical center of camera.

One example of the full derivation of the real-world distance computation based on the variables described with respect to FIGS. 10-14 includes but is not limited to the following:

$$\angle R_S^M O_S A_S = \tan^{-1}\left(\frac{R_S^M A_S}{f}\right) \qquad \text{Eq. (1)}$$

$$\angle P_S O_S R_S = 90° - (\beta + \angle R_S^M O_S A_S) \qquad \text{Eq. (2)}$$
$$\Rightarrow \tan(\angle P_S O_S R_S) = \cot(\beta + \angle R_S^M O_S A_S)$$

-continued $$\tan(\angle P_S O_S R_S) = \frac{X}{h} \qquad \text{Eq. (3)}$$

From the top view of FIG. 10:

$$\angle R_T^M O_T A_T = \tan^{-1}\left(\frac{R_T^M A_T}{f}\right) \qquad \text{Eq. (4)}$$

$$\angle P_T O_T R_T = 90° - (\alpha + \angle R_T^M O_T A_T) \qquad \text{Eq. (5)}$$
$$\Rightarrow \tan(\angle P_T O_T R_T) = \cot(\alpha + \angle R_T^M O_T A_T)$$

$$\tan(\angle P_T O_T R_T) = \frac{X}{d} \qquad \text{Eq. (6)}$$

Putting Eq. (6) in Eq. (3), the distance module 405 obtains:

$$h\tan(\angle P_S O_S R_S) = d\tan(\angle P_T O_T R_T) \quad \text{From Eq. (2) and Eq. (5)}$$

$$\Rightarrow d = h\left(\frac{\tan(\angle P_S O_S R_S)}{\tan(\angle P_T O_T R_T)}\right)$$

$$\Rightarrow d = h\left(\frac{\cot(\beta + \angle R_S^M O_S A_S)}{\cot(\alpha + \angle R_T^M O_T A_T)}\right)$$

$$\Rightarrow d = h\left(\frac{\tan(\alpha + \angle R_T^M O_T A_T)}{\tan(\beta + \angle R_S^M O_S A_S)}\right)$$

From the diagrams of FIGS. 10-14 above, the distance module 405 can determine as follows:

$$\angle R_T^M O_T A_T = \gamma \text{ and } \angle R_S^M O_S A_S = \phi \qquad \text{Eq. (7)}$$

$$\therefore \tan\gamma = \frac{R_T^M A_T}{f} = \frac{v}{f} \qquad \text{Eq. (8)}$$

$$\therefore \tan\gamma = \frac{R_S^M A_S}{f} = \frac{w}{f}$$

$$\Rightarrow d = h\left(\frac{\tan(\alpha + \gamma)}{\tan(\beta + \phi)}\right)$$

Using identity $\tan(A + B) = \frac{\tan A + \tan B}{1 - \tan A \tan B}$ $$\Rightarrow d = h\left(\frac{\tan\alpha + \tan\gamma}{1 - \tan\alpha\tan\gamma}\right)\left(\frac{1 - \tan\beta\tan\phi}{\tan\beta + \tan\phi}\right)$$

$$\Rightarrow d = h\left(\frac{\tan\alpha + \tan\gamma}{\tan\beta + \tan\phi}\right)\left(\frac{1 - \tan\beta\tan\phi}{1 - \tan\alpha\tan\gamma}\right)$$

From the diagrams of FIGS. 10-14 above, the distance module 405 can also determine the following:

$$\tan\alpha = \frac{k_T^*}{f} \qquad \text{Eq. (9)}$$

$$\tan\beta = \frac{k_S^*}{f} \qquad \text{Eq. (10)}$$

Putting these into the derived equations, the distance module 405 determines the following:

$$d = h\left(\frac{k_T + v}{k_S + w}\right)\left(\frac{f^2 - k_T v}{f^2 - k_S w}\right)$$

The above is the formula for the horizontal distance d. From Eq. (3), the distance module 405 knows that:

$$\tan(\angle P_S O_S R_S) = \frac{X}{h}$$

$$\Rightarrow \tan(90° - (\beta + \phi)) = \frac{X}{h}$$

$$\Rightarrow X = \frac{h}{\tan(\beta + \phi)}$$

$$\Rightarrow X = \frac{h(1 - \tan\beta \tan\phi)}{\tan\beta + \tan\phi}$$

Putting Eq. (8) and Eq. (10) in this equation, the distance module 405 determines the following:

$$\Rightarrow X = \frac{h\left(1 - \frac{k_S w}{f^2}\right)}{\frac{k_S}{f} + \frac{w}{f}}$$

$$\Rightarrow X = \frac{h(f^2 - k_S w)}{f(k_S + w)}$$

$$\Rightarrow X = \left(\frac{h}{k_S + w}\right)\left(f - \frac{k_S w}{f}\right)$$

This above is the formula for the depth X.

Therefore, this derivation arrives at the final estimation of the depth X and sideways distance d using the image data coordinates and/or distances observed in the input image. In one embodiment, the output module 407 provides the final estimation of the physical or real-world depth and/or horizontal distance to a feature or object of interest as an output for use be a location-based application or service (e.g., by a services platform 105 and/or one or more services 107a-107n of the services platform 105).

Figure 14:
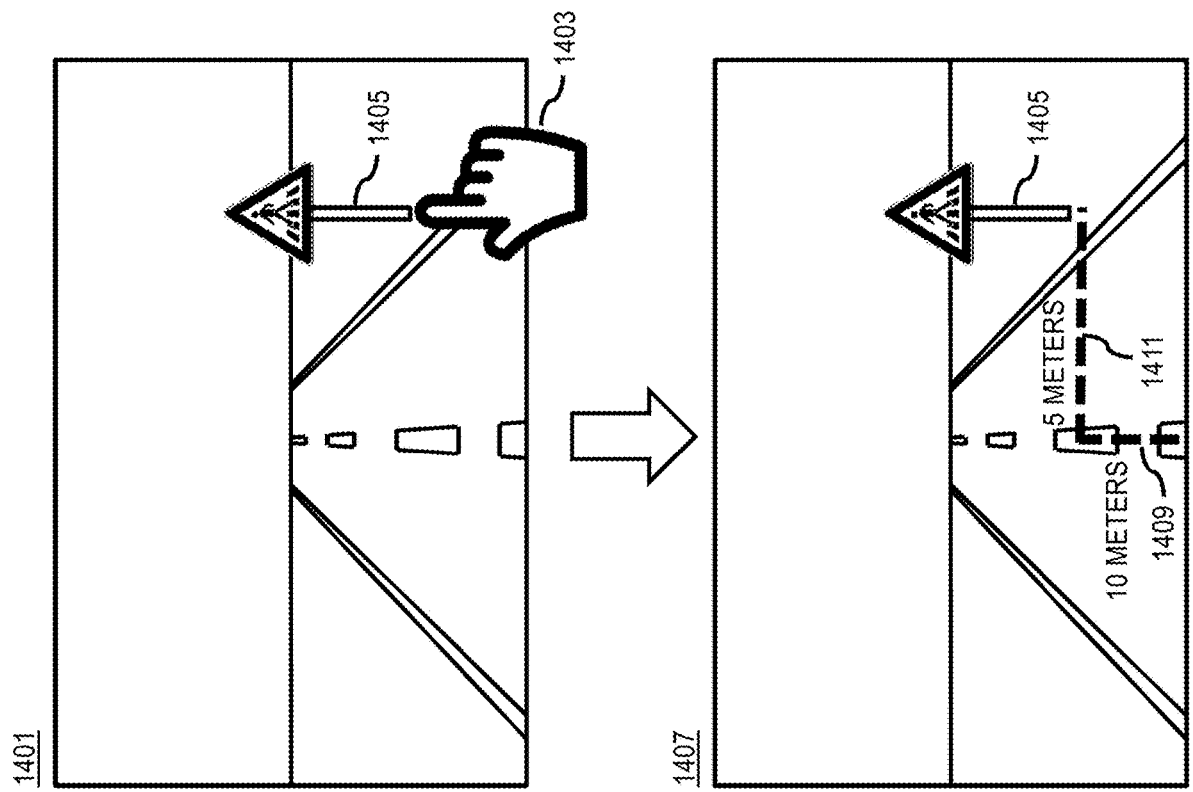
FIG. 14 is a diagram of a user interface for providing real-world distance information from a monocular image, according to one embodiment.

FIG. 14 is a diagram of a user interface (UI) 1401 for providing real-world distance information from a monocular image, according to one embodiment. As shown, the mapping platform 111 receives a user input 1403 (e.g., via touch) to select a road sign 1405 in a monocular image presented in the UI 1401. Based on the selection, the user requests real-world distance and depth information for the base of the road sign 1405. In response, the mapping platform 111 can calculate a corresponding distance and depth of the selected road sign 1405 on the ground plane according to the embodiments described herein to update the UI 1401 with distance and depth information. As shown in the updated user interface 1407, the mapping platform 111 renders a representation 1409 of the calculated depth (e.g., a dotted line extending forward that is annotated with the computed real-world depth of 10 meters) and a representation 1411 of the calculated horizontal or lateral distance (e.g., a dotted horizontal lined extending to the side of the road with the computed real-world horizontal distance of 5 meters) of the road sign 1405.

Returning to FIG. 1, as shown, the system 100 includes the vehicle 101 with connectivity to the mapping platform 111 for providing real-world distances and depths from a single monocular image according to the various embodiments described herein. In one embodiment, the vehicle 101 can include a camera sensor 103 or other equivalent sensor that provides imagery (e.g., image data, photographs, etc.) of perspective view as the vehicle travels. It is contemplated that the camera 103 can use visible light and/or any other electromagnetic wavelength that can be used for imaging on which distance markers can be generated and/or overlaid according to the embodiments described herein. In one embodiment, the system 100 can also include a client terminal 113 (e.g., a user computing device) for access to the functions of the mapping platform 111.

In one embodiment, the mapping platform 111, vehicle 101, client terminal 113, and/or other components of the system 100 have access to the geographic database 109 which stores representations of mapped geographic features derived from the real-world depth or distance information from monocular images to facilitate location-based services such as but not limited to autonomous driving and/or other mapping/navigation-related applications or services.

In one embodiment, the mapping platform 111, vehicle 101, client terminal 113, etc. have connectivity over the communication network 117 to the services platform 105 that provides one or more services 107 that can use the output of the mapping platform 111 including real-world depths or distances computed from a single image. By way of example, the services 107 may be third party services and include mapping services, navigation services, travel planning services, notification services, social networking services, content (e.g., audio, video, images, etc.) provisioning services, application services, storage services, contextual information determination services, location-based services, information-based services (e.g., weather, news, etc.), etc.

In one embodiment, the mapping platform 111, services platform 105, and/or other components of the system 100 may be platforms with multiple interconnected components. The mapping platform 111, services platform 105, etc. may include multiple servers, intelligent networking devices, computing devices, components and corresponding software for providing map-based dynamic location sampling. In addition, it is noted that the mapping platform 111 may be a separate entity of the system 100, a part of the one or more services 107, a part of the services platform 105, or included within the client terminal 113 and/or vehicle 101.

In one embodiment, content providers 119a-119m (collectively referred to as content providers 119) may provide content or data to the geographic database 109, the mapping platform 111, the services platform 105, the services 107, the client terminal 113, and/or the vehicle 101. The content provided may be any type of content, such as map content, textual content, audio content, video content, image content, etc. In one embodiment, the content providers 119 may provide content that may aid in computing real-world depths or distances from a single image according to the embodiments described herein. In one embodiment, the content providers 119 may also store content associated with the geographic database 109, mapping platform 111, services platform 105, services 107, client terminal 113, and/or vehicle 101. In another embodiment, the content providers 119 may manage access to a central repository of data, and offer a consistent, standard interface to data, such as a repository of the geographic database 109.

In one embodiment, the client terminal 113 and/or vehicle 101 may execute a software application (e.g., application 115) for providing real-world depth or distance data from single images for location-based services according the embodiments described herein. By way of example, the application may also be any type of application that is executable on the client terminal 113 and/or vehicle 101, such as autonomous driving applications, mapping applications, location-based service applications, navigation applications, content provisioning services, camera/imaging application, media player applications, social networking applications, calendar applications, and the like. In one embodiment, the application may act as a client for the mapping platform 111, services platform 105, and/or services 107 and perform one or more functions associated with providing distance markers in images.

By way of example, the client terminal 113 is any type of embedded system, mobile terminal, fixed terminal, or portable terminal including a built-in navigation system, a personal navigation device, mobile handset, station, unit, device, multimedia computer, multimedia tablet, Internet node, communicator, desktop computer, laptop computer, notebook computer, netbook computer, tablet computer, personal communication system (PCS) device, personal digital assistants (PDAs), audio/video player, digital camera/camcorder, positioning device, fitness device, television receiver, radio broadcast receiver, electronic book device, game device, or any combination thereof, including the accessories and peripherals of these devices, or any combination thereof. It is also contemplated that the client terminal 113 can support any type of interface to the user (such as "wearable" circuitry, etc.). In one embodiment, the client terminal 113 may be associated with the vehicle 101 or be a component part of the vehicle 101.

In one embodiment, the client terminal 113 and/or vehicle 101 are configured with various sensors for generating or collecting environmental sensor data (e.g., for processing by the mapping platform 111), related geographic data, etc. including but not limited to, location, optical, radar, ultrasonic, LiDAR, etc. sensors. In one embodiment, the sensed data represent sensor data associated with a geographic location or coordinates at which the sensor data was collected. By way of example, the sensors may include a global positioning sensor for gathering location data (e.g., GPS), a network detection sensor for detecting wireless signals or receivers for different short-range communications (e.g., Bluetooth, Wi-Fi, Li-Fi, near field communication (NFC) etc.), temporal information sensors, a camera/imaging sensor for gathering image data (e.g., the camera sensors may automatically capture map features or attributes that can be placed using distance markers), an audio recorder for gathering audio data, velocity sensors mounted on steering wheels of the vehicles, switch sensors for determining whether one or more vehicle switches are engaged, and the like.

Other examples of sensors of the client terminal 113 and/or vehicle 101 may include light sensors, orientation sensors augmented with height sensors and acceleration sensor (e.g., an accelerometer can measure acceleration and can be used to determine orientation of the vehicle), tilt sensors to detect the degree of incline or decline of the vehicle along a path of travel, moisture sensors, pressure sensors, etc. In a further example embodiment, sensors about the perimeter of the client terminal 113 and/or vehicle 101 may detect the relative distance of the vehicle from a lane or roadway, the presence of other vehicles, pedestrians, traffic lights, potholes and any other objects, or a combination thereof. In one scenario, the sensors may detect weather data, traffic information, or a combination thereof. In one embodiment, the client terminal 113 and/or vehicle 101 may include GPS or other satellite-based receivers to obtain geographic coordinates from satellites 121 for determining current location and time. Further, the location can be determined by visual odometry, triangulation systems such as A-GPS, Cell of Origin, or other location extrapolation technologies. In yet another embodiment, the sensors can determine the status of various control elements of the car, such as activation of wipers, use of a brake pedal, use of an acceleration pedal, angle of the steering wheel, activation of hazard lights, activation of head lights, etc.

In one embodiment, the communication network 117 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for 5G New Radio (5G NR or simply 5G), microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), any other generation of cellular technology, and the like, or any combination thereof.

By way of example, the mapping platform 111, services platform 105, services 107, client terminal 113, vehicle 101, and/or content providers 119 communicate with each other and other components of the system 100 using well known, new or still developing protocols. In this context, a protocol includes a set of rules defining how the network nodes within the communication network 117 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 15:
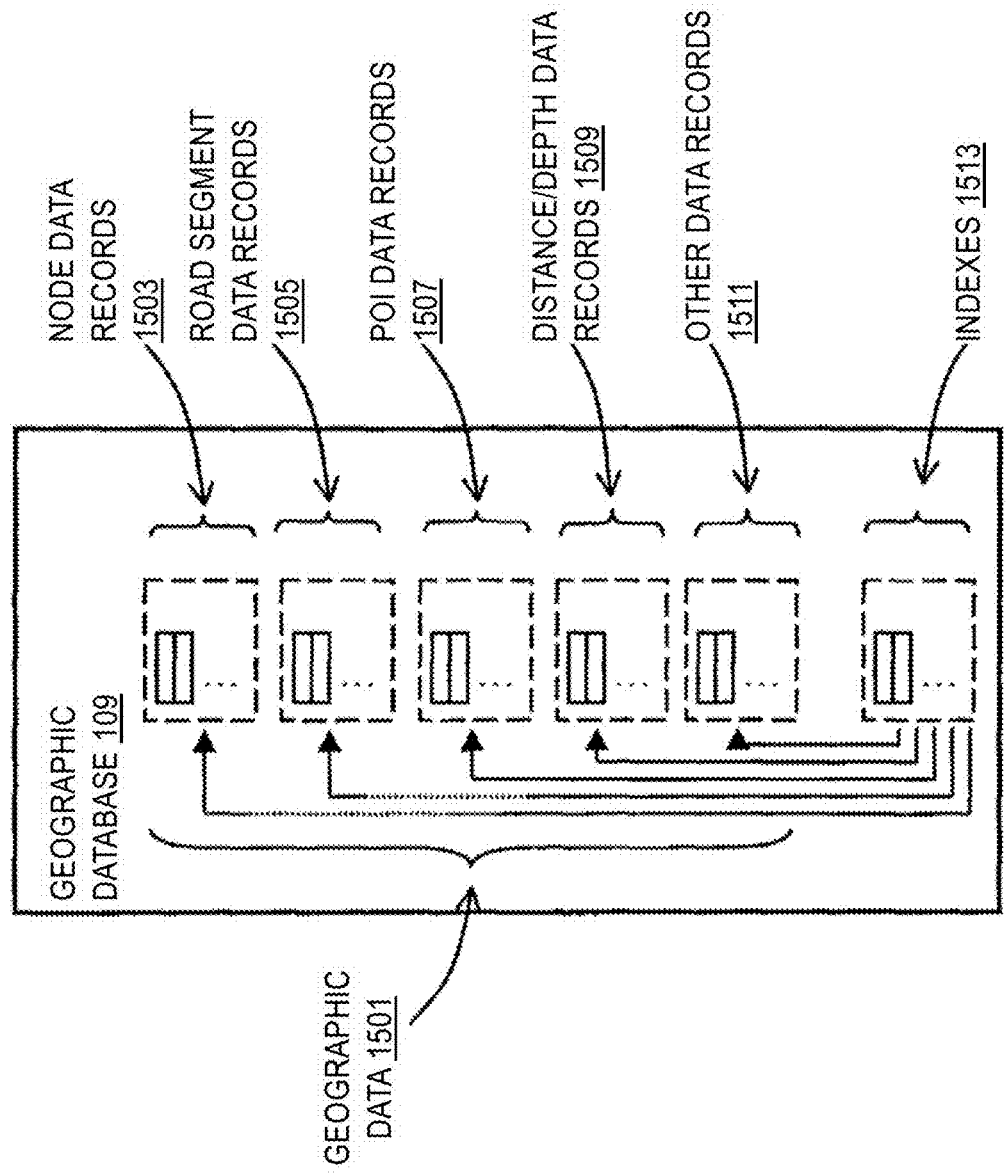
FIG. 15 is a diagram of a geographic database, according to one embodiment.

FIG. 15 is a diagram of a geographic database, according to one embodiment. In one embodiment, the geographic database 109 includes geographic data 1501 used for (or configured to be compiled to be used for) mapping and/or navigation-related services. In one embodiment, geographic features (e.g., two-dimensional or three-dimensional features) are represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions. Accordingly, the terms polygons and polygon extrusions as used herein can be used interchangeably.

In one embodiment, the following terminology applies to the representation of geographic features in the geographic database 109.

"Node"—A point that terminates a link.

"Line segment"—A straight line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non-reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the geographic database 109 follows certain conventions. For example, links do not cross themselves and do not cross each other except at a node. Also, there are no duplicated shape points, nodes, or links. Two links that connect each other have a common node. In the geographic database 109, overlapping geographic features are represented by overlapping polygons. When polygons overlap, the boundary of one polygon crosses the boundary of the other polygon. In the geographic database 109, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

As shown, the geographic database 109 includes node data records 1503, road segment or link data records 1505, POI data records 1507, distance/depth data records 1509, other records 1511, and indexes 1513, for example. More, fewer or different data records can be provided. In one embodiment, additional data records (not shown) can include cartographic ("carto") data records, routing data, and maneuver data. In one embodiment, the indexes 1513 may improve the speed of data retrieval operations in the geographic database 109. In one embodiment, the indexes 1513 may be used to quickly locate data without having to search every row in the geographic database 109 every time it is accessed. For example, in one embodiment, the indexes 1513 can be a spatial index of the polygon points associated with stored feature polygons.

In exemplary embodiments, the road segment data records 1505 are links or segments representing roads, streets, or paths, as can be used in the calculated route or recorded route information for determination of one or more personalized routes. The node data records 1503 are end points corresponding to the respective links or segments of the road segment data records 1505. The road link data records 1505 and the node data records 1503 represent a road network, such as used by vehicles, cars, and/or other entities. Alternatively, the geographic database 109 can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 109 can include data about the POIs and their respective locations in the POI data records 1507. The geographic database 109 can also include data about places, such as cities, towns, or other communities, and other geographic features, such as bodies of water, mountain ranges, etc. Such place or feature data can be part of the POI data records 1507 or can be associated with POIs or POI data records 1507 (such as a data point used for displaying or representing a position of a city).

In one embodiment, the geographic database 109 can also include distance/depth data records 1509 for storing computed distance and depth information generated from single images (e.g., monocular images) and/or related data. The distance/depth data records 1509 can also include collected vehicle sensor data (e.g., images), detected map feature locations, user preferences with respect to distance/depth computations, and/or the like. In one embodiment, the distance/depth data records 1509 and/or related map features or attributes can be associated with segments of a road link (as opposed to an entire link). It is noted that the segmentation of the road for the purposes of distance/depth computations and associated map attribute placement can be different than the street network or road link structure of the geographic database 109. In other words, the segments can further subdivide the links of the geographic database 109 into smaller segments (e.g., of uniform lengths such as 5-meters). In this way, the distance/depth data and/or corresponding map features can be placed or represented at a level of granularity that is independent of the granularity or at which the actual road or road network is represented in the geographic database 109. In one embodiment, the distance/depth data records 1509 can be associated with one or more of the node records 1503, road segment records 1505, and/or POI data records 1507; or portions thereof (e.g., smaller or different segments than indicated in the road segment records 1505, individual lanes of the road segments, etc.).

In one embodiment, the geographic database 109 can be maintained by the content provider 119 in association with the services platform 105 (e.g., a map developer). The map developer can collect geographic data to generate and enhance the geographic database 109. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used.

In one embodiment, the geographic database 109 include high resolution or high definition (HD) mapping data that provide centimeter-level or better accuracy of map features. For example, the geographic database 109 can be based on Light Detection and Ranging (LiDAR) or equivalent technology to collect billions of 3D points and model road surfaces and other map features down to the number lanes and their widths. In one embodiment, the HD mapping data capture and store details such as the slope and curvature of the road, lane markings, roadside objects such as sign posts, including what the signage denotes. By way of example, the HD mapping data enable highly automated vehicles to precisely localize themselves on the road, and to determine road attributes (e.g., learned speed limit values) to at high accuracy levels.

In one embodiment, the geographic database 109 is stored as a hierarchical or multilevel tile-based projection or structure. More specifically, in one embodiment, the geographic database 109 may be defined according to a normalized Mercator projection. Other projections may be used. By way of example, the map tile grid of a Mercator or similar projection is a multilevel grid. Each cell or tile in a level of the map tile grid is divisible into the same number of tiles of that same level of grid. In other words, the initial level of the map tile grid (e.g., a level at the lowest zoom level) is divisible into four cells or rectangles. Each of those cells are in turn divisible into four cells, and so on until the highest zoom or resolution level of the projection is reached. In one embodiment, the map-based dynamic location sampling rates/data transmission rates can be associated with individual grid cells at any zoom level.

In one embodiment, the map tile grid may be numbered in a systematic fashion to define a tile identifier (tile ID). For example, the top left tile may be numbered 00, the top right tile may be numbered 01, the bottom left tile may be numbered 10, and the bottom right tile may be numbered 11. In one embodiment, each cell is divided into four rectangles and numbered by concatenating the parent tile ID and the new tile position. A variety of numbering schemes also is possible. Any number of levels with increasingly smaller geographic areas may represent the map tile grid. Any level (n) of the map tile grid has $2(n+1)$ cells. Accordingly, any tile of the level (n) has a geographic area of $A/26(n+1)$ where A is the total geographic area of the world or the total area of the map tile grid 10. Because of the numbering system, the exact position of any tile in any level of the map tile grid or projection may be uniquely determined from the tile ID.

In one embodiment, the system 100 may identify a tile by a quadkey determined based on the tile ID of a tile of the map tile grid. The quadkey, for example, is a one-dimensional array including numerical values. In one embodiment, the quadkey may be calculated or determined by interleaving the bits of the row and column coordinates of a tile in the grid at a specific level. The interleaved bits may be converted to a predetermined base number (e.g., base 10, base 4, hexadecimal). In one example, leading zeroes are inserted or retained regardless of the level of the map tile grid in order to maintain a constant length for the one-dimensional array of the quadkey. In another example, the length of the one-dimensional array of the quadkey may indicate the corresponding level within the map tile grid 10. In one embodiment, the quadkey is an example of the hash or encoding scheme of the respective geographical coordinates of a geographical data point that can be used to identify a tile in which the geographical data point is located.

The geographic database 109 can be a geographic database stored in a format that facilitates updating, maintenance, and development. For example, the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by the vehicle 101 and/or client terminal 113. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received network in a delivery format to produce one or more compiled navigation databases.

The processes described herein for providing real-world distance information from a monocular image may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 16:
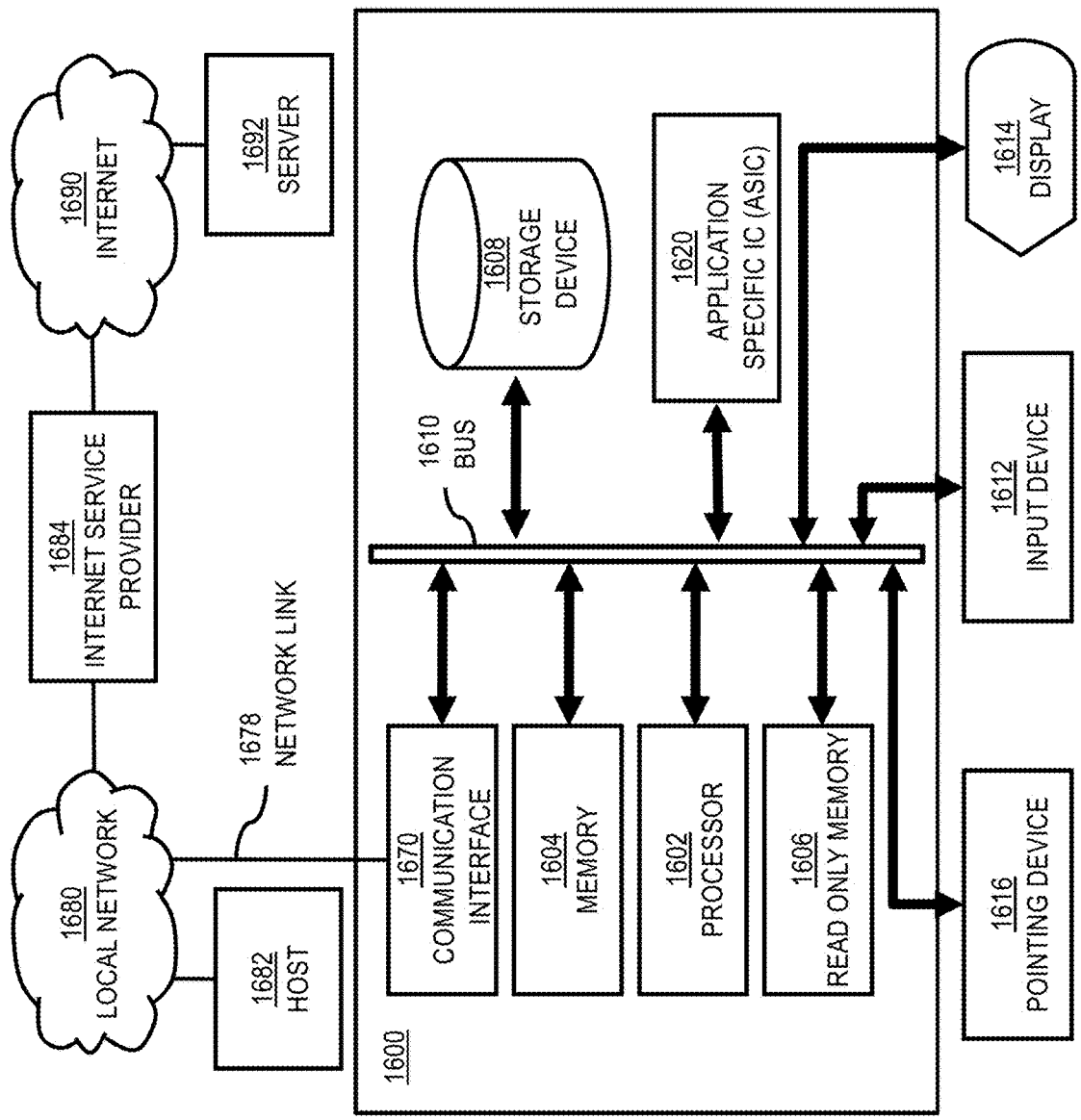
FIG. 16 is a diagram of hardware that can be used to implement an embodiment.

FIG. 16 illustrates a computer system 1600 upon which an embodiment of the invention may be implemented. Computer system 1600 is programmed (e.g., via computer program code or instructions) to provide real-world distance information from a monocular image as described herein and includes a communication mechanism such as a bus 1610 for passing information between other internal and external components of the computer system 1600. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 1610 includes one or more parallel conductors of information so that information is transferred quickly among devices coupled to the bus 1610. One or more processors 1602 for processing information are coupled with the bus 1610.

A processor 1602 performs a set of operations on information as specified by computer program code related to providing real-world distance information from a monocular image. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1610 and placing information on the bus 1610. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1602, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1600 also includes a memory 1604 coupled to bus 1610. The memory 1604, such as a random access memory (RAM) or other dynamic storage device, stores information including processor instructions for providing real-world distance information from a monocular image. Dynamic memory allows information stored therein to be changed by the computer system 1600. RAM allows a unit of information stored at a location called a memory address to be stored and retrieved independently of information at neighboring addresses. The memory 1604 is also used by the processor 1602 to store temporary values during execution of processor instructions. The computer system 1600 also includes a read only memory (ROM) 1606 or other static storage device coupled to the bus 1610 for storing static information, including instructions, that is not changed by the computer system 1600. Some memory is composed of volatile storage that loses the information stored thereon when power is lost. Also coupled to bus 1610 is a non-volatile (persistent) storage device 1608, such as a magnetic disk, optical disk or flash card, for storing information, including instructions, that persists even when the computer system 1600 is turned off or otherwise loses power.

Information, including instructions for providing real-world distance information from a monocular image, is provided to the bus 1610 for use by the processor from an external input device 1612, such as a keyboard containing alphanumeric keys operated by a human user, or a sensor. A sensor detects conditions in its vicinity and transforms those detections into physical expression compatible with the measurable phenomenon used to represent information in computer system 1600. Other external devices coupled to bus 1610, used primarily for interacting with humans, include a display device 1614, such as a cathode ray tube (CRT) or a liquid crystal display (LCD), or plasma screen or printer for presenting text or images, and a pointing device 1616, such as a mouse or a trackball or cursor direction keys, or motion sensor, for controlling a position of a small cursor image presented on the display 1614 and issuing commands associated with graphical elements presented on the display 1614. In some embodiments, for example, in embodiments in which the computer system 1600 performs all functions automatically without human input, one or more of external input device 1612, display device 1614 and pointing device 1616 is omitted.

In the illustrated embodiment, special purpose hardware, such as an application specific integrated circuit (ASIC) 1620, is coupled to bus 1610. The special purpose hardware is configured to perform operations not performed by processor 1602 quickly enough for special purposes. Examples of application specific ICs include graphics accelerator cards for generating images for display 1614, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1600 also includes one or more instances of a communications interface 1670 coupled to bus 1610. Communication interface 1670 provides a one-way or two-way communication coupling to a variety of external devices that operate with their own processors, such as printers, scanners and external disks. In general the coupling is with a network link 1678 that is connected to a local network 1680 to which a variety of external devices with their own processors are connected. For example, communication interface 1670 may be a parallel port or a serial port or a universal serial bus (USB) port on a personal computer. In some embodiments, communications interface 1670 is an integrated services digital network (ISDN) card or a digital subscriber line (DSL) card or a telephone modem that provides an information communication connection to a corresponding type of telephone line. In some embodiments, a communication interface 1670 is a cable modem that converts signals on bus 1610 into signals for a communication connection over a coaxial cable or into optical signals for a communication connection over a fiber optic cable. As another example, communications interface 1670 may be a local area network (LAN) card to provide a data communication connection to a compatible LAN, such as Ethernet. Wireless links may also be implemented. For wireless links, the communications interface 1670 sends or receives or both sends and receives electrical, acoustic or electromagnetic signals, including infrared and optical signals, that carry information streams, such as digital data. For example, in wireless handheld devices, such as mobile telephones like cell phones, the communications interface 1670 includes a radio band electromagnetic transmitter and receiver called a radio transceiver. In certain embodiments, the communications interface 1670 enables connection to the communication network 117 for providing real-world distance information from a monocular image.

The term computer-readable medium is used herein to refer to any medium that participates in providing information to processor 1602, including instructions for execution. Such a medium may take many forms, including, but not limited to, non-volatile media, volatile media and transmission media. Non-volatile media include, for example, optical or magnetic disks, such as storage device 1608. Volatile media include, for example, dynamic memory 1604. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

FIG. 17 illustrates a chip set 1700 upon which an embodiment of the invention may be implemented. Chip set 1700 is programmed to provide real-world distance information from a monocular image as described herein and includes, for instance, the processor and memory components described with respect to FIG. 16 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 1700 includes a communication mechanism such as a bus 1701 for passing information among the components of the chip set 1700. A processor 1703 has connectivity to the bus 1701 to execute instructions and process information stored in, for example, a memory 1705. The processor 1703 may include one or more processing cores with each core configured to perform independently. A multi-core processor enables multiprocessing within a single physical package. Examples of a multi-core processor include two, four, eight, or greater numbers of processing cores. Alternatively or in addition, the processor 1703 may include one or more microprocessors configured in tandem via the bus 1701 to enable independent execution of instructions, pipelining, and multithreading. The processor 1703 may also be accompanied with one or more specialized components to perform certain processing functions and tasks such as one or more digital signal processors (DSP) 1707, or one or more application-specific integrated circuits (ASIC) 1709. A DSP 1707 typically is configured to process real-world signals (e.g., sound) in real time independently of the processor 1703. Similarly, an ASIC 1709 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1703 and accompanying components have connectivity to the memory 1705 via the bus 1701. The memory 1705 includes both dynamic memory (e.g., RAM, magnetic disk, writable optical disk, etc.) and static memory (e.g., ROM, CD-ROM, etc.) for storing executable instructions that when executed perform the inventive steps described herein to provide real-world distance information from a monocular image. The memory 1705 also stores the data associated with or generated by the execution of the inventive steps.

Figure 18:
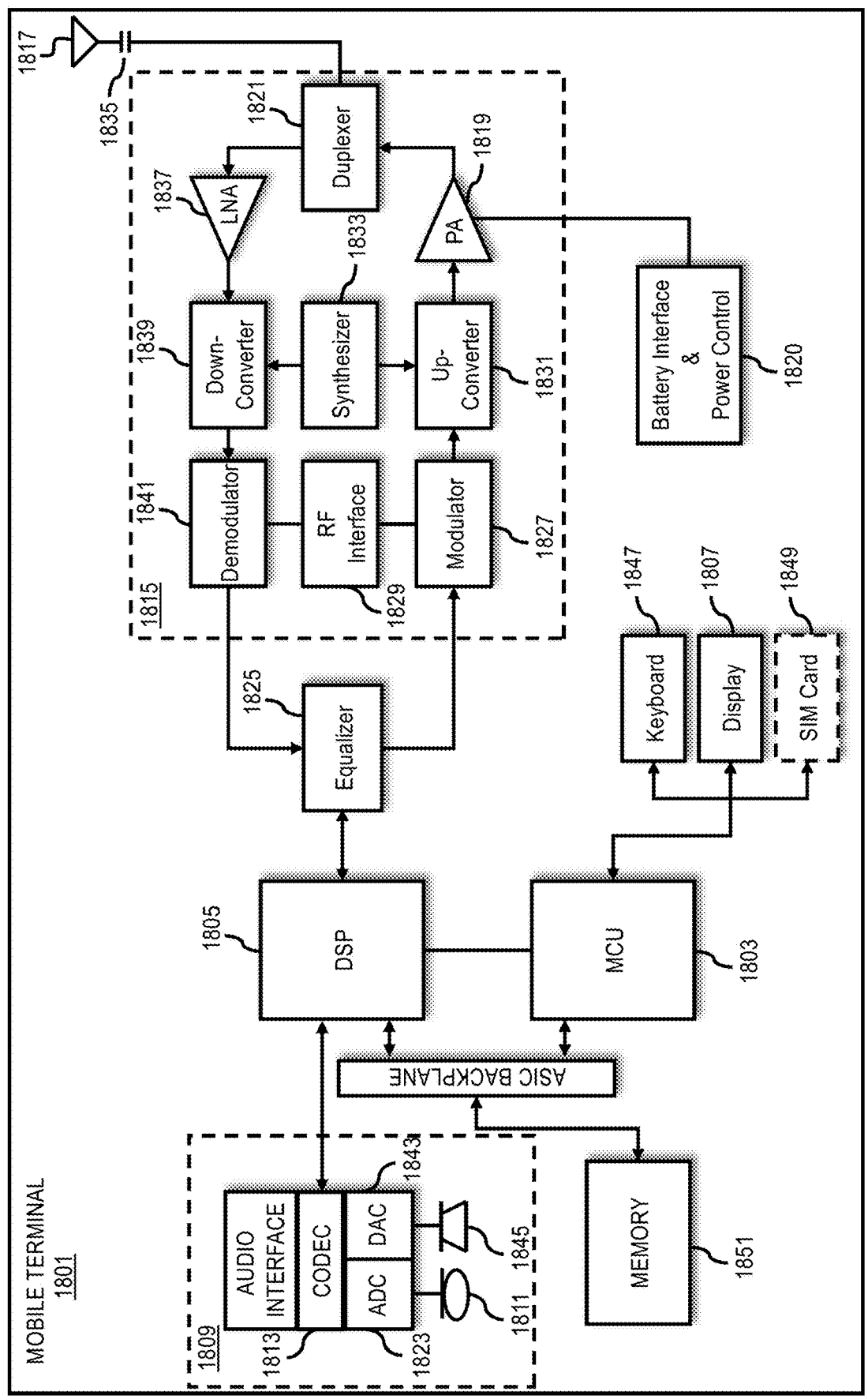
FIG. 18 is a diagram of a mobile terminal (e.g., handset or vehicle or part thereof) that can be used to implement an embodiment of the invention.

FIG. 18 is a diagram of exemplary components of a mobile terminal 1801 (e.g., a client terminal 113, vehicle 101, or part thereof) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1803, a Digital Signal Processor (DSP) 1805, and a receiver/transmitter unit including a microphone gain control unit and a speaker gain control unit. A main display unit 1807 provides a display to the user in support of various applications and mobile station functions that offer automatic contact matching. An audio function circuitry 1809 includes a microphone 1811 and microphone amplifier that amplifies the speech signal output from the microphone 1811. The amplified speech signal output from the microphone 1811 is fed to a coder/decoder (CODEC) 1813.

A radio section 1815 amplifies power and converts frequency in order to communicate with a base station, which is included in a mobile communication system, via antenna 1817. The power amplifier (PA) 1819 and the transmitter/modulation circuitry are operationally responsive to the MCU 1803, with an output from the PA 1819 coupled to the duplexer 1821 or circulator or antenna switch, as known in the art. The PA 1819 also couples to a battery interface and power control unit 1820.

In use, a user of mobile station 1801 speaks into the microphone 1811 and his or her voice along with any detected background noise is converted into an analog voltage. The analog voltage is then converted into a digital signal through the Analog to Digital Converter (ADC) 1823. The control unit 1803 routes the digital signal into the DSP 1805 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1825 for compensation of any frequency-dependent impairments that occur during transmission though the air such as phase and amplitude distortion. After equalizing the bit stream, the modulator 1827 combines the signal with a RF signal generated in the RF interface 1829. The modulator 1827 generates a sine wave by way of frequency or phase modulation. In order to prepare the signal for transmission, an up-converter 1831 combines the sine wave output from the modulator 1827 with another sine wave generated by a synthesizer 1833 to achieve the desired frequency of transmission. The signal is then sent through a PA 1819 to increase the signal to an appropriate power level. In practical systems, the PA 1819 acts as a variable gain amplifier whose gain is controlled by the DSP 1805 from information received from a network base station. The signal is then filtered within the duplexer 1821 and optionally sent to an antenna coupler 1835 to match impedances to provide maximum power transfer. Finally, the signal is transmitted via antenna 1817 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1801 are received via antenna 1817 and immediately amplified by a low noise amplifier (LNA) 1837. A down-converter 1839 lowers the carrier frequency while the demodulator 1841 strips away the RF leaving only a digital bit stream. The signal then goes through the equalizer 1825 and is processed by the DSP 1805. A Digital to Analog Converter (DAC) 1843 converts the signal and the resulting output is transmitted to the user through the speaker 1845, all under control of a Main Control Unit (MCU) 1803—which can be implemented as a Central Processing Unit (CPU) (not shown).

The MCU 1803 receives various signals including input signals from the keyboard 1847. The keyboard 1847 and/or the MCU 1803 in combination with other user input components (e.g., the microphone 1811) comprise a user interface circuitry for managing user input. The MCU 1803 runs a user interface software to facilitate user control of at least some functions of the mobile station 1801 to provide real-world distance information from a monocular image. The MCU 1803 also delivers a display command and a switch command to the display 1807 and to the speech output switching controller, respectively. Further, the MCU 1803 exchanges information with the DSP 1805 and can access an optionally incorporated SIM card 1849 and a memory 1851. In addition, the MCU 1803 executes various control functions required of the station. The DSP 1805 may, depending upon the implementation, perform any of a variety of conventional digital processing functions on the voice signals. Additionally, DSP 1805 determines the background noise level of the local environment from the signals detected by microphone 1811 and sets the gain of microphone 1811 to a level selected to compensate for the natural tendency of the user of the mobile station 1801.

The CODEC 1813 includes the ADC 1823 and DAC 1843. The memory 1851 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1851 may be, but not limited to, a single memory, CD, DVD, ROM, RAM, EEPROM, optical storage, or any other non-volatile or non-transitory storage medium capable of storing digital data.

An optionally incorporated SIM card 1849 carries, for instance, important information, such as the cellular phone number, the carrier supplying service, subscription details, and security information. The SIM card 1849 serves primarily to identify the mobile station 1801 on a radio network.

The card 1849 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method for computing real-world distance information from a monocular image comprising:
    determining a vanishing point of the monocular image captured by a camera;
    generating a vanishing point ray from an optical center of the camera through the vanishing point on an image plane of the monocular image to infinity;
    generating a center line ray from the optical center of the camera through a geometric center of the image plane to a feature line, wherein the feature line is parallel to the vanishing point ray at a lateral distance corresponding to a feature location of a feature depicted in the monocular image;
    generating a feature ray from the optical center of the camera through a feature pixel location of the feature on the image plane to the feature location on the feature line; and
    computing a horizontal distance, a depth, or a combination of the feature location based on image coordinate data corresponding to the vanishing point ray, the center line ray, the feature ray, one or more angles derived therefrom, and a known pixel-wise distance of the monocular image.

2. The method of claim 1, wherein the known pixel-wise distance is determined based on a field of view and a focal length of the camera to generate the horizontal distance, the depth, or a combination thereof.

3. The method of claim 1, wherein the horizontal distance, the depth, or a combination thereof is determined with respect to a top view, a side view, or a combination thereof of the vanishing point ray, the center line ray, the feature ray, or a combination thereof.

4. The method of claim 1, wherein the vanishing point ray, the center line ray, the feature ray, or a combination thereof are further based on a height of the camera from a surface plane.

5. The method of claim 1, wherein the feature line corresponds to a road edge of a road depicted in the monocular image.

6. The method of claim 5, further comprising:
    generating a central road line passing through a center of the road;
    generating a first line from the feature as depicted in the monocular image to the central road line, wherein the first line is perpendicular to the central road line;
    generating a second line from the feature as depicted in the monocular image to the road edge, wherein the second line is perpendicular to the road edge; and
    mapping the feature as depicted in the monocular image to the feature pixel location on the feature line based on an angle formed by the first line and the second line.

7. The method of claim 1, further comprising:
    computing a camera pose of the camera based on the vanishing point ray, the center line ray, the feature ray, one or more angles derived therefrom, and a known pixel-wise distance of the monocular image.

8. The method of claim 1, further comprising:
providing the horizontal distance, the depth, or a combination thereof as an output for use by a location-based application or service.

9. The method of claim 1, wherein the feature is a base of a pole-like feature.

10. The method of claim 1, wherein the vanishing point is determined based on a segmenting of the monocular image into road pixels and non-road pixels.

11. An apparatus for determining a vanishing point of an image comprising:
at least one processor; and
at least one memory including computer program code for one or more programs,
the at least one memory and the computer program code configured to, with the at least one processor, cause the apparatus to perform at least the following,
segment the image into a plurality of road pixels and a plurality of non-road pixels;
extract a road mask from the image based on the segmenting, wherein the road mask comprises the plurality of road pixels;
determine a closest pixel of the road mask to a horizon of the image; and
provide the closest pixel as an initial estimation of the vanishing point of the image.

12. The apparatus of claim 11, wherein the apparatus is further caused to:
iteratively compute a subsequent estimation of the vanishing point at an offset from the initial estimation or a previous estimation of the vanishing point until a difference between the initial estimation or the previous estimation and the subsequent estimation is below a threshold value.

13. The apparatus of claim 12, wherein the apparatus is further caused to:
determine a left edge and a right edge of the road based on the road mask,
wherein the subsequent estimation is computed based on a mid-point between the left edge and the right edge of the road at the offset.

14. The apparatus of claim 12, wherein the difference is based on a Euclidean distance between the initial estimation or the previous destination and the subsequent estimation of the vanishing point.

15. The apparatus of claim 11, wherein the apparatus is further caused to:

provide the vanishing point as an output for estimating real-world depth information from a monocular image.

16. A non-transitory computer-readable storage medium for computing real-world distance information from a monocular image, carrying one or more sequences of one or more instructions which, when executed by one or more processors, cause an apparatus to perform:
determining a vanishing point of the monocular image captured by a camera;
generating a vanishing point ray from an optical center of the camera through the vanishing point on an image plane of the monocular image to infinity;
generating a center line ray from the optical center of the camera through a geometric center of the image plane to a feature line, wherein the feature line is parallel to the vanishing point ray at a lateral distance corresponding to a feature location of a feature depicted in the monocular image;
generating a feature ray from the optical center of the camera through a feature pixel location of the feature on the image plane to the feature location on the feature line; and
computing a horizontal distance, a depth, or a combination of the feature location based on image coordinate data corresponding to the vanishing point ray, the center line ray, the feature ray, one or more angles derived therefrom, and a known pixel-wise distance of the monocular image.

17. The non-transitory computer-readable storage medium of claim 16, wherein the known pixel-wise distance is determined based on a field of view and a focal length of the camera to generate the horizontal distance, the depth, or a combination thereof.

18. The non-transitory computer-readable storage medium of claim 16, wherein the horizontal distance, the depth, or a combination thereof is determined with respect to a top view, a side view, or a combination thereof of the vanishing point ray, the center line ray, the feature ray, or a combination thereof.

19. The non-transitory computer-readable storage medium of claim 16, wherein the vanishing point ray, the center line ray, the feature ray, or a combination thereof are further based on a height of the camera from a surface plane.

20. The non-transitory computer-readable storage medium of claim 16, wherein the feature line corresponds to a road edge of a road depicted in the monocular image.

* * * * *